US012596531B2

(12) United States Patent
Shaked et al.

(10) Patent No.: US 12,596,531 B2
(45) Date of Patent: Apr. 7, 2026

(54) TOOLCAST MANAGEMENT SYSTEM

(71) Applicant: Wix.com Ltd., Tel Aviv (IL)

(72) Inventors: Niv Shaked, Ganei Tikva (IL); Elad Lev Bogomolny, Kiryat Ono (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

(21) Appl. No.: 17/735,656

(22) Filed: May 3, 2022

(65) Prior Publication Data

US 2022/0357931 A1 Nov. 10, 2022

Related U.S. Application Data

(60) Provisional application No. 63/184,809, filed on May 6, 2021, provisional application No. 63/183,662, filed on May 4, 2021.

(51) Int. Cl.
*G06F 8/33* (2018.01)
*G06F 8/34* (2018.01)
*G06F 9/451* (2018.01)

(52) U.S. Cl.
CPC .................. *G06F 8/33* (2013.01); *G06F 8/34* (2013.01); *G06F 9/451* (2018.02)

(58) Field of Classification Search
CPC .............. G06F 8/33; G06F 8/34; G06F 9/451
USPC ........................................................ 717/111
See application file for complete search history.

(56) References Cited

U.S. PATENT DOCUMENTS

| | | | |
|---|---|---|---|
| 5,432,940 A * | 7/1995 | Potts ....................... | G06F 9/542 |
| | | | 719/318 |
| 10,073,923 B2 | 9/2018 | Koren et al. | |
| 10,185,703 B2 | 1/2019 | Abrahami | |
| 10,209,966 B2 | 2/2019 | Abrahami et al. | |
| 10,733,078 B2 | 8/2020 | Mordo et al. | |
| 10,818,058 B1 * | 10/2020 | Gupta .................. | G11B 27/031 |
| 10,984,177 B2 | 4/2021 | Fialkow et al. | |
| 11,275,815 B2 | 3/2022 | Siani Cohen et al. | |
| 2014/0064693 A1 * | 3/2014 | Deshpande ........ | H04N 21/4828 |
| | | | 386/230 |
| 2014/0282218 A1 | 9/2014 | Kaufman et al. | |

(Continued)

OTHER PUBLICATIONS

International Search Report for corresponding application PCT/IL2022/050463 mailed on Aug. 28, 2022.

*Primary Examiner* — Bradford F Wheaton
(74) *Attorney, Agent, or Firm* — Heidi Brun Associates Ltd.; Heidi M. Brun

(57) ABSTRACT

A system for creating and displaying toolcasts includes a processor and a toolcast management system running on the processor in communication with an underlying system. The toolcast management system to create, display and update at least one toolcast to provide media guidance to a user of the underlying system according to the toolcast management interface with the underlying system and the interaction between the user and the at least one toolcast. The toolcast management system includes an interface module to interface with the underlying system and to detect at least one of: objects, data, activities, and events to be recorded in a recording phase for the at least one toolcast; a toolcast creator to record, generate and edit said at least one toolcast according to at least the output of the interface module and a toolcast player to play said at least one toolcast while interacting with said user.

16 Claims, 11 Drawing Sheets

(56) References Cited

U.S. PATENT DOCUMENTS

| 2015/0242104 | A1* | 8/2015 | Stokman | G11B 27/031 |
| | | | | 707/706 |
| 2017/0010903 | A1* | 1/2017 | Kidron | G11B 27/031 |
| 2017/0084189 | A1* | 3/2017 | Rubalcaba | G09B 7/04 |
| 2017/0269945 | A1 | 9/2017 | Patel | |
| 2018/0090027 | A1* | 3/2018 | Lehrian | G06F 9/453 |
| 2018/0204376 | A1* | 7/2018 | Winnemöller | G06T 19/20 |
| 2018/0293323 | A1 | 10/2018 | Abrahami et al. | |
| 2018/0300162 | A1 | 10/2018 | Kotlicki | |
| 2019/0026280 | A1 | 1/2019 | Aviyam et al. | |
| 2019/0147351 | A1 | 5/2019 | Wang | |
| 2019/0260841 | A1* | 8/2019 | Roberts | H04L 67/535 |
| 2020/0151226 | A1 | 5/2020 | Blumenfeld et al. | |
| 2022/0261816 | A1 | 8/2022 | Gadot et al. | |

* cited by examiner

TOOLCAST MANAGEMENT SYSTEM

CROSS REFERENCE TO RELATED APPLICATIONS

This application claims priority from U.S. provisional patent applications 63/183,662, filed May 4, 2021, and 63/184,809, filed May 6, 2021, both of which are incorporated herein by reference.

FIELD OF THE INVENTION

The present invention relates to the creation of assistive content elements generally and to websites and applications in particular.

BACKGROUND OF THE INVENTION

Website building systems (WBS) are used by both novices and professionals to create interactive websites. Existing WBSs are based on a visual editing model and most WBSs typically provide multiple templates, with a template possibly including a complete sample website, a website section, a single page or a section of a page.

WBS users (also known as designers, subscribers, subscribing users or site editors) may design the website and the website's end-users (the "users of users") may access the websites created by the users. Although end-users typically access the system in read-only mode, WBSs (and websites) may allow end-users to perform changes to the web site such as adding or editing data records, adding talkbacks to news articles, adding blog entries to blogs etc. The WBS may in fact allow multiple levels of users (i.e., more than two levels), and assign different permissions and capabilities to each level. Users of the WBS (in particular in the full or partial on-line configurations described in more detail herein below) may register with the WBS server which manages the users, their web sites and is accessed by the end-users.

A WBS may be a standalone system, or may be embedded inside a larger editing system. It may also be on-line (i.e., applications are edited and stored on a server), off-line or partially on-line (with web sites being edited locally but uploaded to a central server for publishing). The WBS may use an internal data architecture to store WBS based sites and this architecture may organize the handled sites' internal data and elements inside the system. This architecture may be different from the external view of the site (as seen, for example, by the end-users). It is also typically different from the way the HTML pages sent to the browser are organized.

For example, the internal data architecture may contain additional properties for each element in the page (creator, creation time, access permissions, link to templates, SEO (search engine optimization) related information etc.) which are relevant for the editing and maintenance of the site in the WBS, but are not externally visible to end-users (or even to some editing users). The WBS may implement some of its functionality (including both editing and run-time functionality) on a server or server set, and some of its functionality on client elements. The WBS may also determine dynamically whether to perform some functionality on the server or on the client platform.

A WBS typically handles the creation and editing of visually designed applications (such as a website) consisting of pages, containers and components. Pages may be separately displayed and contain components. Components may include containers as well as atomic components. Reference is made to FIG. 1, which is a schematic block-diagram illustration of a website building system (WBS) 2 which may be used for building a website 3, in accordance with some demonstrative embodiments of the present invention. WBS 2 may be used to build, produce, edit and/or generate website 3, which may comprise pages 4 which may include components 5 (e.g., text, images, videos).

The WBS may also support hierarchical arrangements of components using atomic components (text, image, shape, video etc.) as well as various types of container components which contain other components (e.g., regular containers, single-page containers, multi-page containers, gallery containers etc.). The sub-pages contained inside a container component are referred to as mini-pages, and each of which may contain multiple components. Some container components may display just one of the mini-pages at a time, while others may display multiple mini-pages simultaneously.

The components may be content-less, or have internal content. An example of the first category is a star-shape component, which does not have any internal content (though it has color, size, position, attributes and other parameters). An example of the second category is a text paragraph component, whose internal content includes the internal text as well as font, formatting and layout information (which is also part of the content rather than being attributes of the component). This content may, of course, vary from one instance of the text paragraph component to another. Components which have content are often referred to as fields (e.g., a "text field").

Pages may use templates: general page templates or component templates. Specific cases for templates include the use of an application master page containing components replicated in all other regular pages, and the use of an application header or footer (which repeat on all pages). Templates may be used for the complete page or for page sections. The WBS may provide inheritance between templates, pages or components, possibly including multi-level inheritance, multiple inheritance and diamond inheritance (i.e., A inherits from B and C and both B and C inherit from D).

The visual arrangement of components inside a page is called a layout. The WBS may also support dynamic layout processing, a process whereby the editing of a given component (or other changes affecting it such as externally-driven content change) may affect other components, as further described in U.S. Pat. No. 10,185,703 entitled "Website Design System Integrating Dynamic Layout and Dynamic Content" granted 22 Jan. 2019, commonly owned by the Applicant and incorporated herein by reference.

A WBS may be extended using add-on applications such as a third party application and its components (TPAs), list applications (such as discussed in US Patent Publication No. US 2014/0282218 entitled "WBS Integrating Data Lists with Dynamic Customization and Adaptation" published 18 Sep. 2014, commonly owned by the Applicant and incorporated herein by reference) and WBS configurable applications (WCAs, such as described in US Patent Publication No. 2020/0151226 entitled "System And Method for Creation and Handling of Configurable Applications for Website Building Systems" published 14 May 2020, and now issued as U.S. Pat. No. 11,698,944 on Jul. 11, 2023, commonly owned by the Applicant and incorporated herein by reference). These third party applications and list applications may be added and integrated into designed websites.

Such third party applications and list applications may be purchased (or otherwise acquired) through a number of distribution mechanisms, such as being pre-included in the WBS design environment, from an Application Store (integrated into the WBS's market store or external to it) or directly from the third party application vendor.

The third party application may be hosted on the WBS vendor's own servers, the third party application vendor's server or on a 4th party server infrastructure.

The WBS may also allow procedural code to be added to some or all of the system's entities. Such code could be written in a standard language (such as JavaScript), an extended version of a standard language or a language proprietary to the specific WBS. The executed code may reference APIs provided by the WBS itself or external providers. The code may also reference internal constructs and objects of the WBS, such as pages, components and their attributes.

The procedural code elements may be activated via event triggers which may be associated with user activities (such as mouse move or click, page transition etc.), activities associated with other users (such as an underlying database or a specific database record being updated by another user), system events or other types of conditions. The use of such procedural code elements is further described in U.S. Pat. No. 10,209,966 entitled "Custom back-end functionality in an online website building environment" granted 19 Feb. 2019, commonly owned by the Applicant and incorporated herein by reference.

The activated code may be executed inside the WBS's client element, on the server platform or by using a combination of the two or a dynamically determined execution platform. Such a system is described in US Patent Publication No. US 2018/0293323 entitled "System and Method for Smart Interaction Between Website Components" published 11 Oct. 2018, and issued as U.S. Pat. No. 11,449,573 on Sep. 20, 2022, commonly owned by the Applicant and incorporated herein by reference.

Typical site creation may be based on a number of models, including a visual editing model (in which the user edits a previously created site) and an automatic site generation model or a combination thereof as illustrated in FIG. 2 to which reference is now made and is described in U.S. Pat. No. 10,073,923 entitled "System and Method for the Creation and Update of Hierarchical Websites Based on Collected Business Knowledge" granted 11 Sep. 2018, commonly owned by the Applicant and incorporated herein by reference.

It will be appreciated that throughout the specification, the acronym WBS may be used to represent a website building system. FIG. 2 illustrates a system 100 that comprises a typical WBS 2 in communication with client systems operated by WBS vendor staff 61, a site designer 62 (i.e., a user), a site viewer 63 (i.e., user of user) and with external systems 70. WBS 2 may further comprise a WBS site manager 10, an object marketplace 15, a WBS RT (runtime) server 20, a WBS editor 30, a site generator system 40 and a WBS content management system (CMS) 50.

In the visual editing model, the user (designer) edits a site based on one or more website templates. The WBS provider may provide multiple site (or other) templates, with each template possibly including a complete sample web site, a web site section, a single page or a section of a page. Users may have the option to start with an empty site (essentially a "blank page" template) but would typically start with an actual site template.

The WBS provider may provide site templates ranging from the very generic (e.g., mobile site, e-store) through the more specific (e.g., law office, restaurant, florist) to the highly specific ones (e.g., a commercial real-estate law office or a Spanish tapas restaurant). Such templates are typically stored in a repository accessible to users of the WBS and are typically classified according to business type, sub-type or industry. Templates may also be created (and classified) according to style, color range or other parameters and not just according to business type. Site templates may be extended with additional (typically back-end) functionality, services and code in order to become full-fledged vertical solutions integrated with the WBS.

The site may be converted/rendered into HTML for viewing. However, in some embodiments, components may be implemented and/or rendered using additional technologies, such as locally installed or downloaded code, plug-ins, rendering frameworks (such as React), graphical display frameworks (such as SVG), or other methods.

Thus, the user's first experience when creating a site using a WBS visual editor may typically be that the user chooses a template (e.g., according to style or industry type/subtype), possibly a blank template and then edits the template in the visual editor including the editing of content, logic, layout and attributes. Such editing may include (in particular) adapting the template and its elements to the details of the user's business. The user may then publish the modified site.

Under the site generation model, the WBS generates an initial site for the user, based on a selected template, possibly modified by filling-in common elements of information, and possibly allowing follow-up editing of the generated site. This filling-in is required as various pieces of information (such as the business name or a description of the management team) are included in multiple locations in the template's pages. Thus, the user may have to change the business name (for example) in multiple places throughout the template.

Furthermore, some template elements (e.g., a generic product page) may appear multiple times, with each instance displaying the details of a different instance of an underlying entity (e.g., different products offered in the site). Such multiple instances may be manually specified (e.g., the details of different persons in the company's management team) or dynamically derived from an external database (e.g., product details from the "products on sale" database). Such an arrangement is often known as a "repeater".

The template may also include fields. For example, the WBS may allow the template designer to specify fields (also known as "placeholders") for the insertion of values inside the templates, such as {CompanyName}, {ProductName}, {ProductPrice} etc. The user may also specify the values for the fields defined in the template selected for the website.

The WBS may allow the user to enter simple or complex values (e.g., text and images), as well as additional (nonfield) information such as selection of included pages or web site areas, colors, style information, links, formatting options, website display options, decoration elements (such as borders and backgrounds) etc.

The WBS may also allow the user to enter some of this additional information before selecting a template, and use this information to help in selecting a template (e.g., by narrowing the set of proposed templates). For example, the user may select a certain generic color scheme (e.g., pastel colors) or style (e.g., business/formal), and the system may then use this selection to narrow the set of proposed templates.

The WBS may also display a series of views or questionnaires to allow the user to enter values or selections (for both the defined fields and the additional information above). The WBS may further create a connection (or binding) between a multiple-instance element of the template (as described herein above) and an internal or external database which provides the data instances used to generate the displayed instances.

Once a template has been selected and its fields and additional information have been specified (e.g., through the questionnaires or through binding to data sources), the WBS may generate the website containing the combined information. The user may then publish the site (through the WBS or otherwise).

A WBS may support SEO review for application constructed in the WBS, as discussed in US Patent Publication No. US 2019/0026280 entitled "System and method for integration of search engine optimization in website building systems" published 24 Jan. 2019, now issued as U.S. Pat. No. 11,314,837 on Apr. 26, 2022, commonly owned by the Applicant and incorporated herein by reference.

A WBS may also perform semi-automatic site creation using a different model as described in U.S. Pat. No. 10,073,923. Under this model, the system gathers information on the user and his web site requirements from multiple sources which may include, for example: user-filled questionnaires; existing user presence (such as existing web sites or social media presence), industry sources (such as general trade web sites), off-line information and internal system repositories which provide information on specific business types, such as basic template information for specific business types (lawyers, restaurants, plumbers, graphic designers etc.), possibly refined for specific industries (e.g., distinguishing between real-estate lawyers and personal injury lawyers).

The WBS may also gather external information from other sites, both internal and external to the WBS. Such information may affect, for example, the selection of offered questionnaires and layout elements, proposed defaults etc. Such information may also typically be collected on a statistical or summary basis, in order not to expose information belonging to any single user, and protect users' privacy, anonymity and legal rights (such as copyrights). Such information may be located based on information provided by the user which may be direct (e.g., an existing website address) or indirect (a business name and geographical address which can be used to locate information about the business).

The gathered information is analyzed and arranged into a repository of content elements which are then mapped onto layout elements which present the content from the content elements and combine the layout elements to form the site. The layout element mapping, selection and combination process may be fully automatic or semi-automatic (i.e., including user interaction).

To support the above mentioned functionality, a WBS may typically maintain a series of repositories, stored over one or more servers or server farms. Such repositories may typically include various related repositories such as a user information/profile repository, a WBS (WBS) component repository, a WBS site repository, a Business Intelligence (BI) repository, an editing history repository, a third party application store repository, etc. The system may also include site/content creation related repositories such as a questionnaire type repository, a content element type repository, a layout element type repository, a design kit repository, a filled questionnaires repository, a content element repository, a layout element repository, a rules repository, a family/industry repository etc. A description of these repositories may be found in U.S. Pat. No. 10,073,923.

SUMMARY OF THE PRESENT INVENTION

There is provided, in accordance with a preferred embodiment of the present invention, a system for creating and displaying toolcasts. The system includes a processor and a toolcast management system running on the processor in communication with an underlying system, the toolcast management system to create, display and update at least one toolcast to provide media guidance to a user of the underlying system according to the toolcast management interface with the underlying system and the interaction between the user and the at least one toolcast. The toolcast management system includes an interface module to interface with the underlying system and to detect at least one of: objects, data, activities, and events of the underlying system to be recorded in a recording phase for the at least one toolcast; a TC (toolcast) creator to record, generate and edit the at least one toolcast according to at least the output of the interface module; and a TC (toolcast) player to play the at least one toolcast while interacting with the user.

Moreover, in accordance with a preferred embodiment of the present invention, the underlying system is integrated with the toolcast management system.

Further, in accordance with a preferred embodiment of the present invention, the at least one toolcast is at least one of: active tutorials, documentation, courseware and intra-user messaging.

Still further, in accordance with a preferred embodiment of the present invention, the underlying system is at least one of: a website, a website building system and a document editing system.

Additionally, in accordance with a preferred embodiment of the present invention, the at least one toolcast is at least one of: basic and composite.

Moreover, in accordance with a preferred embodiment of the present invention, the system includes at least one of: a database to store basic toolcasts and composite toolcasts; a maintenance module to maintain the at least one toolcast when a change is made to the underlying system; a toolcast synchronizer to support synchronization of the at least one toolcast with other related toolcasts when a change is made to the underlying system; an underlying system structure mapper to provide mapping of structures, associations, events and interfaces of the underlying system to the toolcast management system for the at least one toolcast; and a ML (machine learning) manager to gather data from the underlying system and about the user and to provide machine learning training and support for the TC creator and the TC player accordingly.

Further, in accordance with a preferred embodiment of the present invention, the TC creator includes at least one of: a toolcast storyboard creator to generate a storyboard for the at least one toolcast; a generative text engine to generate text for the storyboard for the at least one toolcast; an UNS (underlying system) analyzer to analyze elements and site structure of the underlying system; a BI (business intelligence) analyzer to analyze collected business intelligence (BI) information from the underlying system; a CTC (composite toolcast) creator to create a composite toolcast comprising a hierarchy of basic toolcasts; a text based recorder to enable a designer of the at least one toolcast to create a text based toolcast using a rich text editor; a voice based recorder to enable a designer of the at least one toolcast to record themselves and to convert the recording into a toolcast file; an association manager to create toolcast associations in an interfaced configuration of the toolcast management system and the underlying system; a TC (toolcast) path optimizer to determine and optimize the flow of activity of the at least one toolcast; an edit time recommender to offer editing hints and options to the designer of the at least one toolcast; a coverage analyzer to detect mismatches between the underlying system and the at least one toolcast according to the toolcast definition of the at least one toolcast; and an UNS (underlying system)/TC (toolcast) editor to provide integrated editing or combined editing of the underlying system together with the at least one toolcast.

Still further, in accordance with a preferred embodiment of the present invention, the TC player includes at least one of: a TC activator to automatically enable activation of the at least one toolcast by the user; a remote user simulator to enable the at least one toolcast to trigger responsive events on the underlying system by simulating actions of the user; a TC (toolcast) control bar displayer to display toolbars to enable the user to control the display of the at least one toolcast; an ACE (assistive content element) displayer to create additional or augmented UI (user interface) elements on top of the display by the TC control bar displayer; and a user interaction manager to enable interaction between the at least one toolcast and the user while the at least one toolcast is playing.

Additionally, in accordance with a preferred embodiment of the present invention, the interface module includes at least one of: an integrated interfacer to interface with an integrated underlying system; a non-integrated interface to interface with non-integrated underlying system; and an UNS (underlying system) database interfacer to interface with an underlying system database to provide data for analysis by the TC creator.

Moreover, in accordance with a preferred embodiment of the present invention, the at least one toolcast is a user adaptable toolcast.

Further, in accordance with a preferred embodiment of the present invention, the system also includes an additional product generator to execute the at least one toolcast to generate alternative products; an app (application) store to share the at least one toolcast via an Appstore; and a tooltip handler to add the at least one toolcast to existing tooltips.

Still further, in accordance with a preferred embodiment of the present invention, the maintenance module includes at least one of: a TC (toolcast) deployment agent to analyze versions of the underlying system and to gather initial information for the underlying system structure mapper; an information gatherer to gather information on modifications to elements of the at least one toolcast; an update analyzer to receive the information from the information gatherer and to determine toolcast elements from the at least one toolcast that were modified and are non-functional; a notifier to notify at least one of the underlying system and a designer according to the output of the update analyzer; a TC (toolcast) adjuster to correct the non-functional elements of the at least one toolcast accordingly; and a TC (toolcast) fallback applier to convey the content of the at least one toolcast through alternative means.

There is provided, in accordance with a preferred embodiment of the present invention, a method, the method includes creating, displaying and updating at least one toolcast to provide media guidance to a user of an underlying system according to a toolcast management system interface with the underlying system and the interaction between the user and the at least one toolcast. The creating, displaying and updating includes interfacing with the underlying system; detecting at least one of: objects, data, activities, and events of the underlying system to be recorded in a recording phase for the at least one toolcast; recording, generating and editing the at least one toolcast according to at least the output of the detecting; and playing the at least one toolcast while interacting with the user.

Moreover, in accordance with a preferred embodiment of the present invention, the underlying system is integrated with the toolcast management system.

Further, in accordance with a preferred embodiment of the present invention, the at least one toolcast is at least one of active tutorials, documentation, courseware and intra-user messaging.

Still further, in accordance with a preferred embodiment of the present invention, the underlying system is at least one of a website, a website building system and a document editing system.

Additionally, in accordance with a preferred embodiment of the present invention, the at least one toolcast is at least one of: basic and composite.

Moreover, in accordance with a preferred embodiment of the present invention, the method further includes storing in a database basic toolcasts and composite toolcasts; maintaining the at the one toolcast when a change is made to the underlying system; supporting synchronization of the at least one toolcast with other related toolcasts when a change is made to the underlying system; providing mapping of structures, associations, events and interfaces of the underlying system to the toolcast management system for the at least one toolcast; and gathering data about the underlying system and about the user and providing machine learning training and support for the recording, generating and editing the at least one toolcast and the playing the at least one toolcast.

Further, in accordance with a preferred embodiment of the present invention, the recording, generating and editing the at least one toolcast includes at least one of: generating a storyboard for the at least one toolcast; generating text for the storyboard for the at least one toolcast; analyzing elements and site structure of the underlying system; analyzing collected business intelligence (BI) information from the underlying system; creating a composite toolcast comprising a hierarchy of basic toolcasts; enabling a designer of the at least one toolcast to create a text based toolcast using a rich text editor; enabling a designer of the at least one toolcast to record themselves and converting the recording into a toolcast file; creating toolcast associations in an interfaced configuration of the toolcast management system and the underlying system; determining and optimizing the flow of activity of the at least one toolcast; offering editing hints and options to the designer of the at least one toolcast; detecting mismatches between the underlying system and the at least one toolcast according to the toolcast definition of the at least one toolcast; and providing integrated editing or combined editing of the underlying system with the at least one toolcast.

Still further, in accordance with a preferred embodiment of the present invention, the playing the at least one toolcast includes at least one of: automatically enabling activation of the at least one toolcast by the user; enabling the at least one toolcast to trigger responsive events on the underlying system by simulating actions of the user; displaying toolbars to enable the user to control the display of the at least one toolcast; creating additional or augmented UI (user interface) elements on top of the display by the displaying toolbars; and enabling interaction between the at least one toolcast and the user while the at least one toolcast is playing.

Additionally, in accordance with a preferred embodiment of the present invention, the interfacing with the underlying system includes at least one of: interfacing with an integrated underlying system; interfacing with a non-integrated underlying system; and interfacing with an underlying system database to provide data for analysis by the recording, generating and editing.

Moreover, in accordance with a preferred embodiment of the present invention, the at least one toolcast is a user adaptable toolcast.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
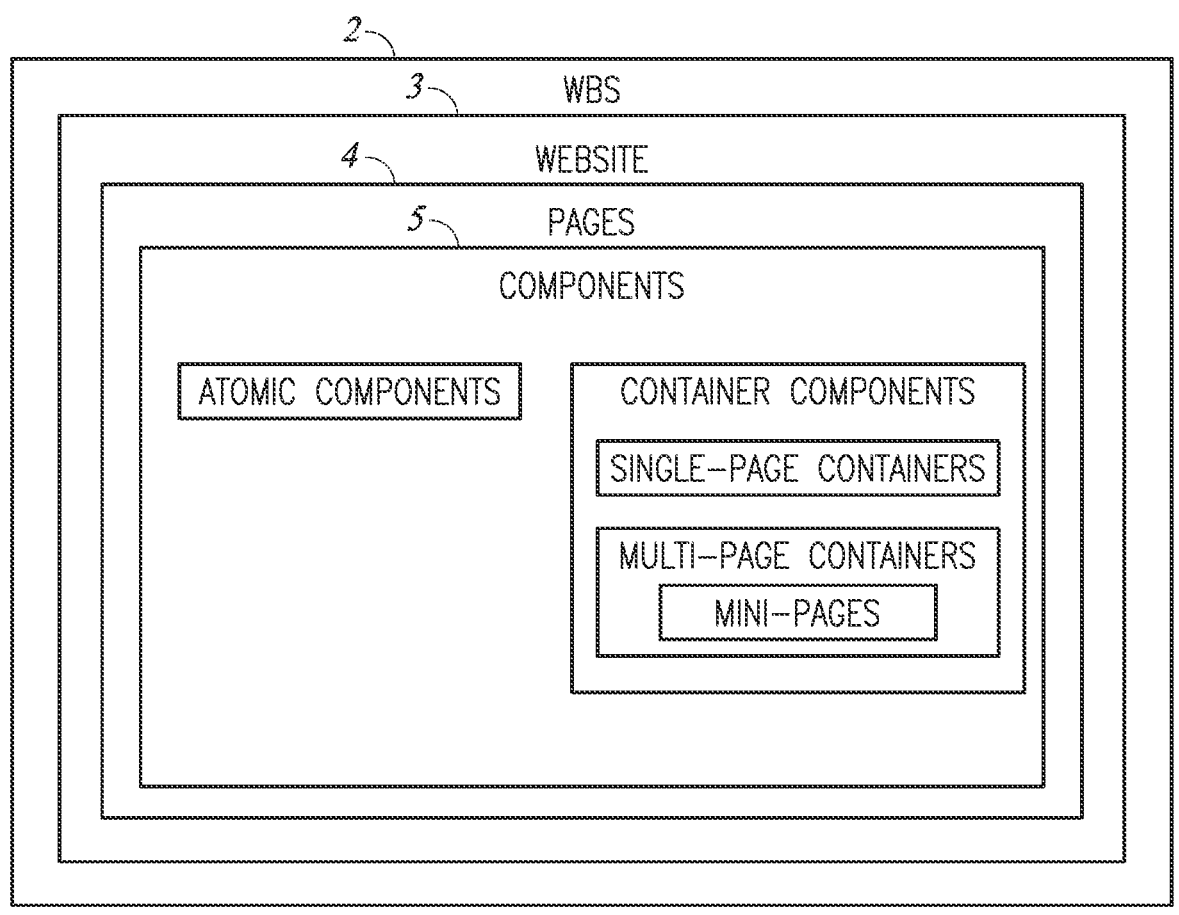
FIG. 1 is a schematic illustration of a typical representation of a website building system of the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Websites and applications typically consist of a complex graphical user interface (GUI) involving multiple pages (or application screens) containing multiple visual components. Applicant has realized that users of such applications often need assistance and guidance in the use of the underlying systems such as designers using website building systems to build such websites and applications.

A highly beneficial solution to these needs is a personal tutor, mentor, or support person sitting next to the designer or user (or at least communicating with the user remotely through a shared screen system). One common alternative to a human tutor is video segments that narrate specific interactions with the underlying system. However, such videos often lack interactivity and quickly become outdated as the underlying system changes.

Applicants have further realized the same benefits may be provided by a toolcast management system that does not require a personal (human) mentor.

A toolcast management system may provide a solution through toolcasts, a media format that uses interaction with the underlying system as a foundation. The toolcast format may be used in conjunction with multiple technologies to create, maintain and activate toolcasts using assisted content elements such as active tutorials, documentation, courseware and intra-user messaging. The media files and player combine interaction (and possibly integration) with the underlying system, synchronized voice-overs, subtitles, or other assistive content elements. Toolcasts may also be user adapted according to user settings such as user parameters, settings and attributes (such as the user's geographical location or browser type) as stored by the underlying system.

Applicants have also realized that the benefits of such a toolcast management system integrated/in communication with an underlying system such as a website may include the ability to run toolcasts dynamically (generating tool events, subtitles, and audio) and the ability for direct interaction with the user and do actions on the website according to the website's own state and data. They may also include the creation of toolcasts dynamically based on user data.

The toolcast management system may also create augmented UI (user interface) elements on top of the underlying system or otherwise merge with the underlying system components and may even suggest or auto-play a toolcast based on the state of (for example) a website, interaction with the website, or through interaction with the system by writing or talking (including voice instructions, chatbot use, guided questions, and looking at user flow).

The toolcast management system may also detect what the user "needs" to do on the website by behavior/BI (business intelligence) analysis, text chatting, and talking with the user through machine learning technology.

Furthermore, the toolcast management system may create a toolcast from a recording of the user performing actions on a website and may detect automatically when an explanation of a function of the website is outdated based on updates to the websites and toolcast recordings.

Other applications of the toolcast management system may include the conversion of toolcasts to other media formats such as text with images or videos and can keep them updated and the ability to auto-generate toolcasts based on machine learning and text to speech technologies.

Finally, the toolcast management system may also handle responsive events on the website DOM reflecting the actions of a remote user (click, drag, hover, scrolling, editing, and creating elements) on multiple supported browsers.

It will be appreciated that a toolcast management system may consist of the toolcasts themselves (which are the data files driving the system), a toolcast editor, a toolcast player, a toolcast deployment agent and a number of additional elements as described in more detail herein below. These elements provide together the ability to execute toolcasts through smart playback, which interface with the underlying system, and use underlying system elements and events to form the displayed narrative.

It will also be appreciated that the toolcast management system architecture may allow the user to participate in the interaction actively. For example, the toolcast file playback (and its flow) may depend on specific actions taken by the user. Furthermore, the user may stop the toolcast player at any point and continue using the underlying system, from the particular stopping point.

The toolcast management system may further provide for re-synchronization of the toolcast files when the underlying system is modified, as well as online re-synchronization. The re-synchronization may be done offline as well as online, e.g., when (for example) the execution timeline of the underlying system changes, e.g., due to differences in the communication performance. Or when unplanned events affect the underlying system's UI (user interface), e.g., a notification pop-up occurring in the middle of the pre-planned interaction.

The toolcast management system may also re-synchronize when the display of the underlying system is changed. For example, if the underlying system components are displayed in a different manner due to changes in display layout (due to dynamic layout, window size, portrait/landscape orientation, components moving due to responsive design considerations, different component variants being displayed etc.)

The toolcast management system may further support the creation and editing of such toolcast files, e.g., through recording of the user's interaction with the underlying system, together with user-provided voice-over or titles. As discussed in more detail herein below, the recording does not consist of screenshots or screen video capture. Instead, it is an object-oriented recording, which captures the displayed objects, the user's interactions with them, and the related dynamic (e.g., motions) and timing information.

Figure 3A:
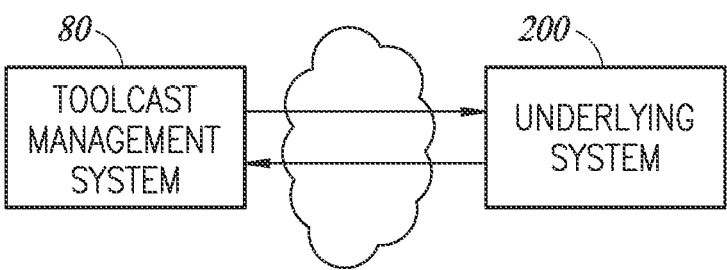
FIGS. 3A and 3B are schematic illustrations of a toolcast management system associated with an underlying system, constructed and operative in accordance with the present invention.
Figure 3B:
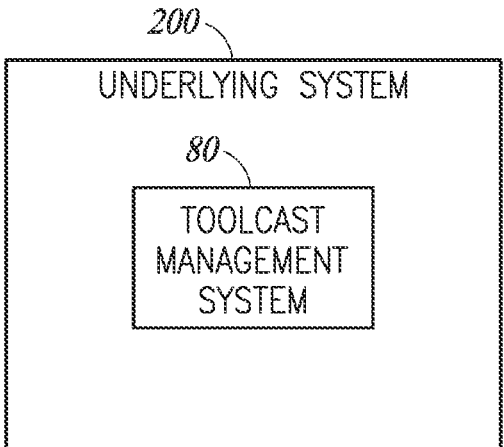

As discussed herein above, a toolcast management system may be used in conjunction with an underlying system. Reference is now made to FIGS. 3A and 3B which illustrate a toolcast management system 80 in communication with underlying system 200 (FIG. 3A) and a toolcast management system 80 integrated with an underlying system (FIG. 3B) according to embodiments of the present invention.

It will be appreciated that the discussion below focuses on the integrated version of toolcast management system 80 with a system or application for which assistance is provided through associated toolcast files operated by toolcast management system 80. Such a supported system 80 may include systems such as a website or other web-based application. It will be appreciated that for a web-based application, toolcast management system 80 may provide its functionality as a service to the designer using WBS so that the designer may offer toolcasts to the users of his or her websites. These sites include both statically defined and dynamically generated sites.

Figure 2:
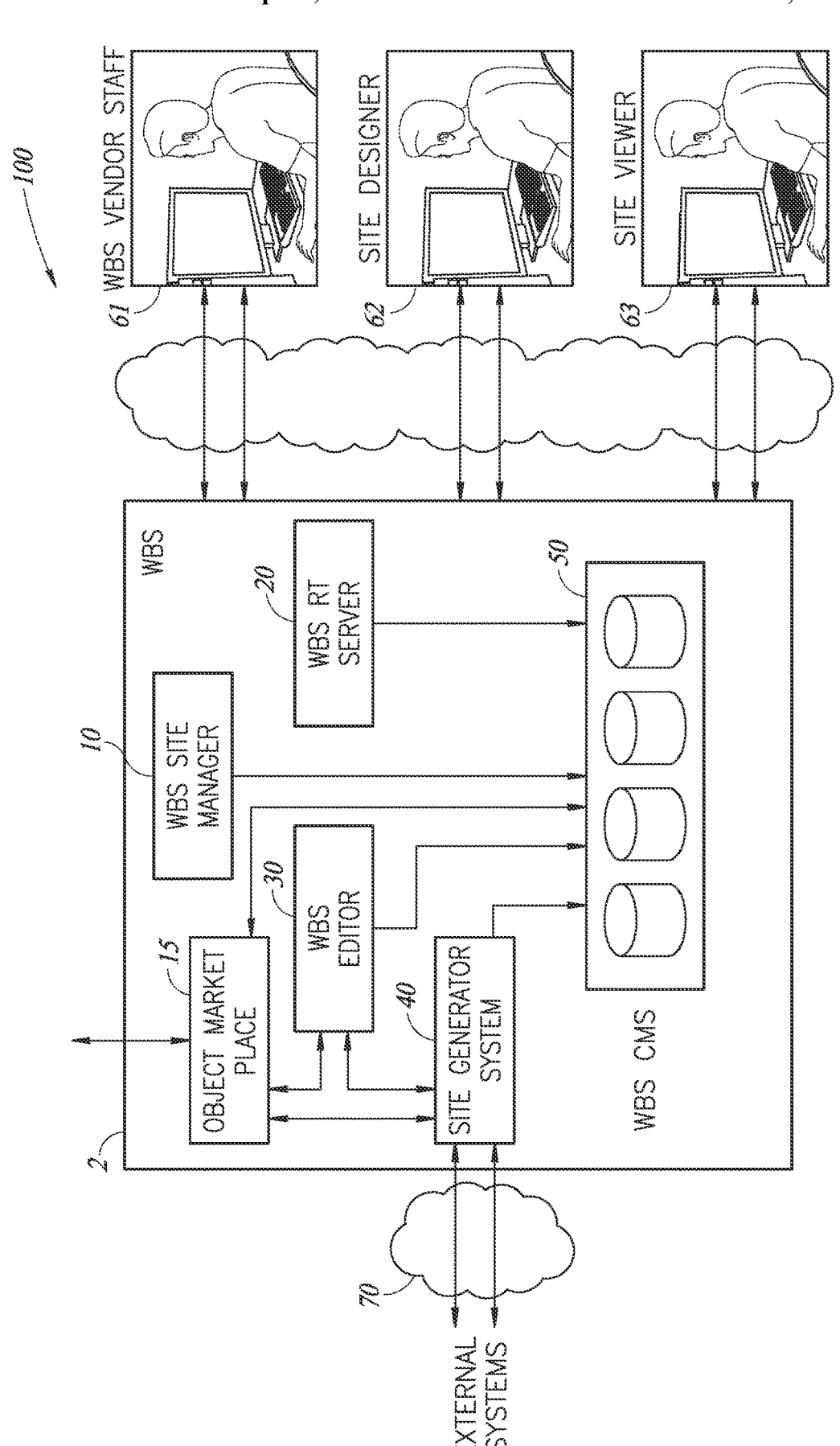
FIG. 2 is a schematic illustration of a system for the creation and update of hierarchical websites of the prior art.
Figure 4:
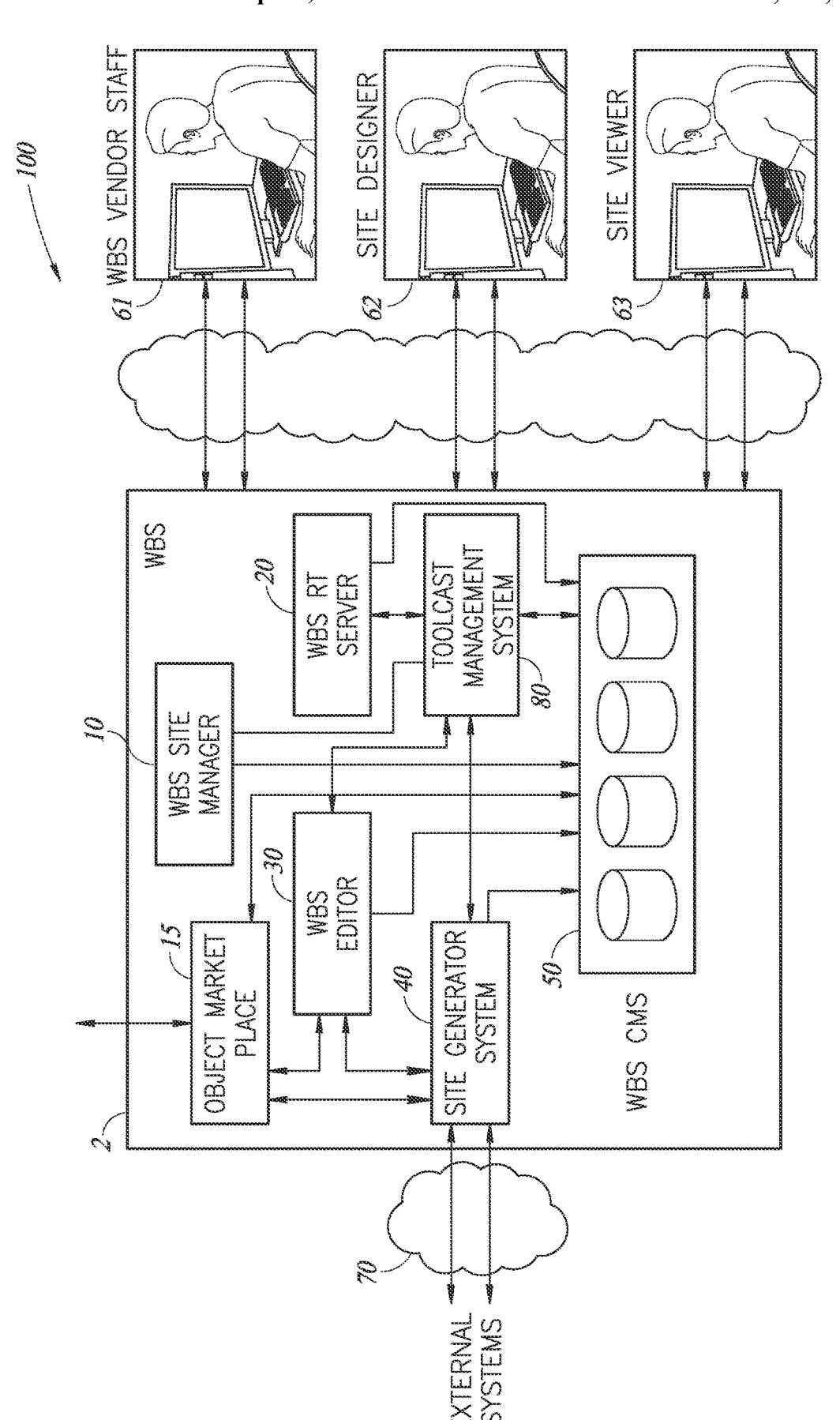
FIG. 4 is a schematic illustration of a toolcast management system integrated with a website building system, constructed and operative in accordance with the present invention.

It will be further appreciated that the underlying system may also be the WBS itself. This case includes, for example, the use of toolcast management system 80 to provide training or documentation to elements of the WBS environment. In this scenario, the supported user could be the website designer using the WBS, or the website user using some aspects of the WBS exposed to the user (e.g., a talkback editing function in a blog website). Reference is now made to FIG. 4 which illustrates toolcast management system 80 integrated with the WBS 100 of FIG. 2.

The toolcast use may be applied to different areas of WBS 100 (besides WBS editor 30), such as management functions, dashboards, vertical applications (and the setup and configuration GUI), and more.

It will be further appreciated that elements of the underlying WBS could be built using the same WBS (i.e., a self-hosted WBS) or a different WBS. Toolcast management system 80 may therefore be used in conjunction with such a WBS and possibly at multiple levels (both for interfacing and providing services).

Underlying system 200 may further be a desktop or mobile application, whether pre-installed or dynamically installed or run.

Underlying system 200 may also be a document editing system of some type such as a word processor, or code IDE (Integrated Development Environment). Such an underlying system 200 may support the editing of a single "document" (e.g., word processing document or web page) or multiple simultaneous documents. Toolcasts operating with an underlying system 200 may support the UI used to edit multiple documents (in a single toolcast).

It will be appreciated that the web-based sites and applications described herein above may also include these rendered via client-side rendering, server-side rendering, mixed rendering, or rendering provided by a framework (such as the React web development framework).

Toolcast management system 80 may also apply to advanced application deployment environments, such as wearable environments, immersive environments (such as virtual reality and augmented reality), and video-based applications.

Therefore, toolcast management system 80 may include aspects and implementation details that differ based on the type of underlying system 200, as discussed in more detail herein below.

The following discussion will typically focus on the implementation of toolcast management system 80 for websites, whether manually developed or WBS-based. As discussed herein above, such sites may be based on a combination of templates at various levels (site, page, section, component set, or component level).

Figure 5:
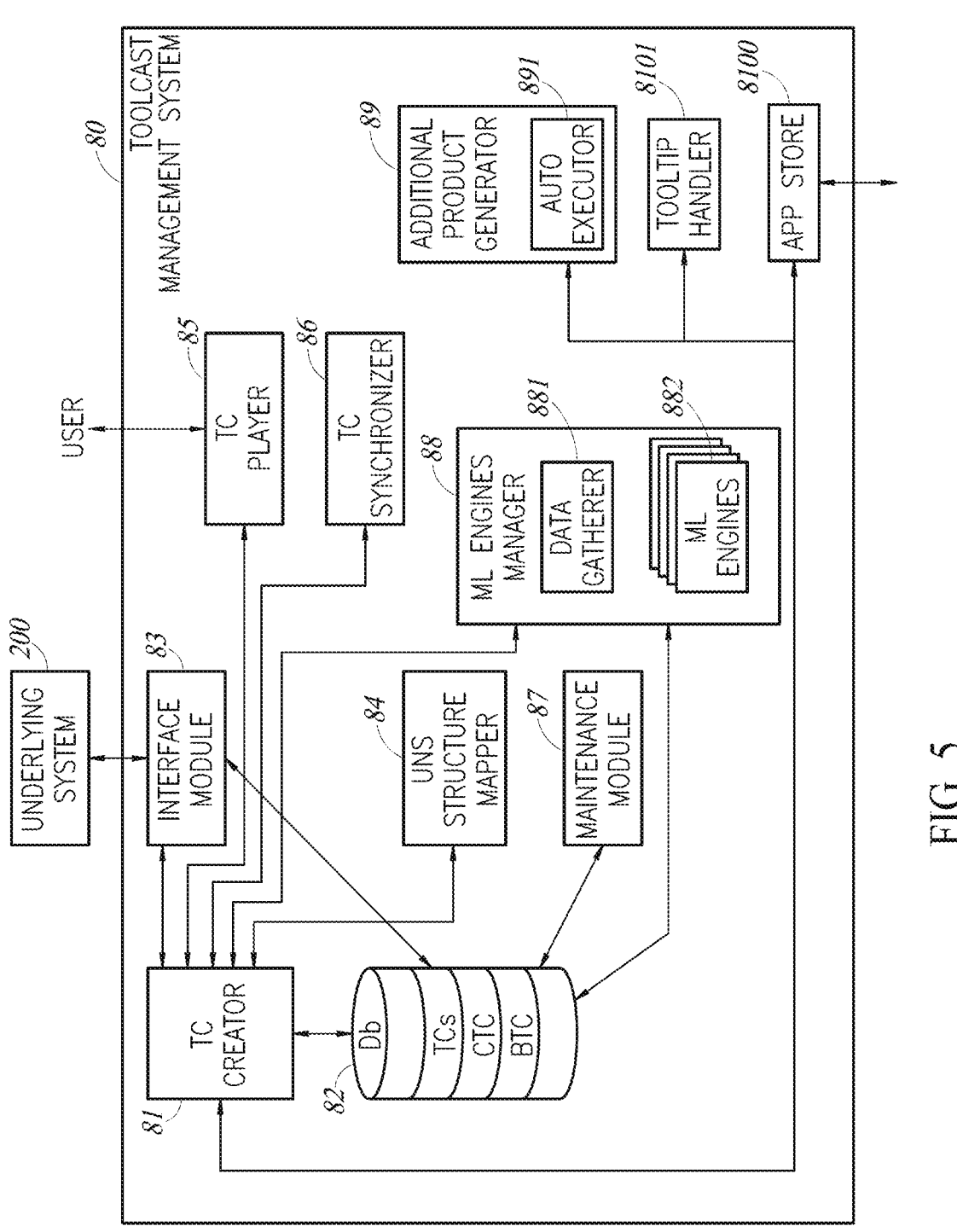
FIG. 5 is a schematic illustration of the elements of the toolcast management system of FIGS. 3A and 3B, constructed and operative in accordance with the present invention.

Reference is now made to FIG. 5 which illustrates the elements of toolcast management system 80. Toolcast management system may comprise a TC (toolcast) creator 81, a database 82, an interface module 83, a UNS (underlying system) structure mapper 84, a TC (toolcast) player 85, a TC (toolcast) synchronizer 86, a maintenance module 87, a ML (machine learning) engines manager 88 and an additional product generator 89, an Appstore interface 8100 and a tooltip handler 8101. ML engines manager 88 may further comprise a data gatherer 881 and multiple ML engines 882 and additional product generator 89 may further comprise an auto executor 891. The functionality of these elements is described in detail herein below.

It will be appreciated that ML engines manager 88 may service the different elements of toolcast management system 80 as discussed in more detail herein below.

TC creator 81 may record, edit and generate toolcasts, database 82 may store toolcasts (including basic toolcasts and composite toolcasts as described in more detail herein below), interface module 83 may provide interfaces according to the type of underlying system 200 (integrated/nonintegrated), UNS (underlying system) structure mapper 84 may provide mapping of the structures of underlying system 200 as well as associations, events and interfaces used to affect the underlying system 200, TC player 85 may be used to play the toolcast and TC synchronizer 86 may be activated on changes to underlying system 200 to support synchronization with related toolcasts. Maintenance module 87 may maintain a toolcast once a change has been made to underlying system 200, ML engines manager 88 may provide machine learning training and support, additional product generator 89 may execute toolcasts to generate alternative products and Appstore interface 8100 may allow created toolcasts to be shared via an Appstore. Tooltip handler 8101 may add toolcasts to existing tooltips. This may include tooltips which are created as a toolcast activation UI. The functionality of these elements will be described in more detail herein below.

A typical usage flow may include the following phases: an underlying system 200 designer or developer may use toolcast management system 80 (e.g., through a hosted service which may provide toolcast services to various systems) to record and edit toolcasts for underlying system 200 as described in more detail herein below. This would include the developer or designer interacting with the underlying system 200 as well as with toolcast management system 80. This could also be a separate toolcast developer who is not an underlying system developer.

The underlying system 200 designer then may store the toolcasts locally, together with underlying system 200, or within a hosted toolcast management system 80. Underlying system 200 may then activate specific toolcasts by itself or based on user actions. TC player 85 may then run the specific toolcast, driving underlying system 200 while interacting with the underlying system 200 end-user.

Toolcast management system 80 may interface with underlying system 200 in both directions. The types of interfaces and their possible implementation methods are discussed herein below.

It will be appreciated that toolcast management system 80 may be used for different application areas and scenarios. The discussion herein below of these areas is in the context of a website designer employing toolcast management system 80 to benefit the users (visitors) of his or her website, though other use cases are available (and further detailed below), such as WBS vendor staff 61 providing toolcasts for designers using the WBS, site owners 62 (WBS based or not) providing toolcasts for visitors to their sites and third party toolcast creators which provide toolcasts for users of various systems (web sites, WBS or otherwise).

One type of use of toolcast management system 80 may be the development of interactive tutorials. It will be appreciated that toolcast management system 80 may be used to create tutorials that are explorable and interactive. The site designer may record site use sessions (e.g., for specific parts of the site). The site visitor may be able to play and pause these recorded sessions and interact with them (e.g., pausing a tutorial and continuing actual system use from the stopping given point).

Such tutorials may also be presented as multi-step instructions or wizards (e.g., pop-up or screen-side instructions). A tutorial may also be presented in conjunction with displayed screen components, e.g., displaying assistive content elements near to or in conjunction with the related elements.

Such a tutorial can also function as courseware. Such tutorials can include quizzes, logic based on user responses, scoring, and learning management functions.

Toolcast management system 80 may also provide "Do It With Me" (DIWM) tutorials. Under a DIWM scenario, toolcast management system 80 may offer the user to perform operations on underlying system 200 on the user's behalf as part of the tutorial section (e.g., "You can perform task X now, or would you like me to do it for you instead?"). The tutorial session may include a mix of tutorial material delivery, tasks performed by the user, and DIWM tasks performed by toolcast management system 80.

Another use of toolcast management system 80 is the creation of interactive documentation. Toolcast management system 80 may be used to enhance a website by associating toolcast files with specific functions or elements of the website. Such toolcast files may replace traditional help functions, which would otherwise be provided by static help files.

Yet another use for toolcast management system 80 is the creation of editable video-like media files which describe functions or procedures of underlying system 200. It will be appreciated that such files may be defined in terms of the UI elements of underlying system 80 rather than a screen capture.

Toolcast management system 80 may detect if the video file is out of sync (e.g., refer to a site element that was deleted or otherwise modified) and may resolve this or otherwise notify the toolcast creator as discussed in more detail herein below. It will be appreciated that such videos may be used for a number of purposes, such as user support or marketing.

Another use of toolcast management system 80 may be messaging related to underlying system 200. Toolcast management system 80 may be used as a method of communication between people who need to communicate about underlying system 200, such as developers, users or people involved in system support, documentation, marketing, testing, etc.

Such people often need to communicate and exchange information related to underlying system 200 operation sequences, requiring additional information to be delivered than the provided screenshots or screen video recording.

Toolcast management system 80 may allow these users to quickly record and create toolcasts containing dynamic flow which would otherwise be hard to convey. Furthermore, the communicated toolcasts, which operate in conjunction with underlying system 200 may allow the recipient to access internal states of underlying system 200 associated with the described underlying system 200 flow. Such messaging may be synchronous (e.g., webinar-type streaming) or asynchronous (e.g., mail/chat type messaging, which can be delayed).

It will be appreciated that the abovementioned description refers to communication between people. However, such "people" can also include computerized nodes, such as bots or other non-human communicating actors.

It will also be appreciated that such messaging and communication may be multi directional such as from website designer to end user, end user to end user, designer to designer, end user to designer, end user/designer to WBS staff and WBS staff to end user/designer.

Toolcast management system 80 may also be used in conjunction with a visual editor (e.g., in a WBS such as WBS editor 30) or other IDE. It will be appreciated that the user of the visual editor or IDE may play a recorded toolcast inside the editor, essentially turning the IDE into an (interactive) media player. Since the toolcast actually interacts with the editor of underlying system 80 (or design environment), the actions of the toolcast are "live" (and not merely displaying fixed recorded media).

Thus, the user may stop the toolcast at any given point and interact with underlying system 200 (or its code) in its new state, as affected by the toolcast. The user may use his or her tools and environment at this stage and learn from the work done (and the changes performed) by the toolcast.

Toolcast management system 80 may allow the toolcast to continue including possibly adapting to the changes made by the user, as further discussed herein below.

Toolcast management system 80 may also be used in conjunction with a structured communication system, such as the customer support described in U.S. Patent Publication No. 2022/0261816 entitled "Structured Communication System Integrating Dynamic Display" published 18 Aug. 2022, and assigned to the common assignee of the present invention and incorporated herein by reference. Such a structured communication system may use toolcasts as a medium of interaction and communication between users and agents using the structured communication system.

Toolcast management system 80 may also provide additional uses for toolcasts outside of the use with TC player 85 as described in more detail herein below.

As discussed herein above, a toolcast data format is a media format that enables toolcast management system 80 to record and playback the process of interacting with a website or application. It may be specific to a given website or generalized to a group of related (or otherwise similar in whole or part) websites.

The toolcast data format may be used as a file format, as-is or stored using a larger container or representation format (e.g., inside video file container file, using XML, JSON, or similar representation etc.). The toolcast data format may also be used as a format for data stored inside a database field or record, a repository, cloud storage (e.g., inside cloud storage buckets), in an object orientated database (OODB), etc.

The toolcast data format may be hierarchical, with basic toolcasts (BTCs) implementing a linear timeline corresponding to a linear sequence of interactions and higher-level composite toolcasts (CTCs) combining multiple BTCs and defining the flow and routing between them.

The toolcast data file may include a set of assistive content elements (ACEs), a set of actions to be performed on underlying system 200, a set of trigger definitions, a flow management element and may also include additional displayable materials, additional types of media, such as these displayed in VR (virtual reality)/AR (augmented reality) environments and interactive components or applications.

The assistive content elements (ACEs), such as audio and subtitles, may be displayed during playback, e.g., during a toolcast-based training session. These ACEs may also include elements (such as annotations and highlighting) to be added to the website, or values used to affect properties of its components.

The set of actions to be performed on underlying system 200 (such as a cursor move, clicking on elements, draw near elements, underlying system 200 UI selections, etc.) may affect the underlying system 200 as if the user was interacting with the website. These actions can also include information added to or affecting the website, as further discussed below.

The set of trigger definitions may be associated with elements, operations, activities and events of the website (which may include both frontend events (visible or not) as well as backend events). Toolcast management system 80 may listen to underlying system 200 to detect events, states and relevant data and trigger specific actions by TC player 85 (including information related to underlying system 200 as well as the user in general discussed herein above).

The flow management element may determine the way actions are performed, and ACEs are displayed based on timelines or detected website events. The flow management element may use linear timelines (for BTCs), state charts, activity graphs (including multi-level graphs) or other mechanisms. Toolcast management system 80 may support branching and input handling in conjunction with some or all of the flow management elements above (e.g., with timelines, state charts (e.g., those run by a state machine) and activity graphs).

The toolcast file may store some or all of the event definitions using component-relative coordinates (so that the definition is not affected if a component is moved). Such component-relative definition may apply to a specific component or a parent container and may be based on anchoring to a corner, edge, center, or other parts of the component. The anchoring may be made in absolute or relative terms (e.g., based on the size of the component). Toolcast management system 80 may further interact with the layout systems used by the underlying system 200 (e.g., a dynamic layout or responsive display system) to adapt to non-obvious changes in the display created by such systems. Such changes may include, for example, components changing their position, size, or arrangement as define for different breakpoints in a responsive website). Such systems are described in U.S. Pat. No. 10,185,703 entitled "Web Site Design System Integrating Dynamic Layout and Dynamic Content" granted 22 Jan. 2019 and U.S. Pat. No. 10,984,177 entitled "System and Method Providing Responsive Editing and Viewing, Integrating Hierarchical Fluid Components and Dynamic Layout" granted 20 Apr. 2021 both assigned to the common assignee of the present invention and incorporated herein by reference.

As discussed herein above, in one possible embodiment, toolcast management system 80 may use timelines (e.g., as created by recording specific user interactions with website areas) to define BTCs. These BTCs form building blocks in CTCs, including multiple interactions and branching structures covering larger areas of a given website.

Such a larger CTC can encompass the interactions with the entire website or application or can cover a subset thereof. Toolcast management system 80 may allow defining a hierarchy of CTCs (providing multi-level hierarchy).

It will be appreciated that the toolcast data files may use a number of data formats such as container formats, modified versions of existing media formats (such as a video format), or specialized data formats. Toolcasts may be physically attached to relevant UI object definitions in underlying system 200 (e.g., as a data blob) or be separately stored.

Regarding ACEs, they can include many types of displayed media in conjunction with underlying system 200. The ACEs may include static media, e.g., text, subtitles or associated images or be dynamic/temporal in nature, e.g., such as audio used for voice-over or other purposes. The dynamic ACEs may also include different media types, such as video, although the primary interactive visual display will typically be generated by TC player 85 interacting with the website.

Additional displayable materials may be arrows or other screen highlights which point to or otherwise emphasize the displayed components. Such elements can be added as an additional layer to the display or integrated with the underlying system 200 display as further discussed herein below.

The interactive components or applications may be a part of toolcast management system 80 (client and server) and operated and activated by the toolcast management system 80. They may also be part of underlying system 200 (e.g., underlying WBS components) while still being started (or otherwise operated, exposed or initiated) directed by toolcast management system 80. Like other displayable ACEs described herein above, they may operate as a separate layer, combined with the underlying system 200 displayed component, or separately displayed. As discussed herein above, toolcast management system 80 may interface with underlying system 200 in both directions.

Toolcast management system 80 may receive information about activities of underlying system 200 through interface module 83 using direct linking, detection, analysis, etc. Interface module 83 may detect underlying system 200 activity to be recorded in the toolcast recording phase and may detect underlying system 200 activity to activate toolcasts associated with specific underlying system 200 objects, data, activities, and events.

Interface module 83 may also detect underlying system 200 objects, data, activities and events which may affect the running of the toolcast while it is playing as well as detect changes in underlying system 200 that affect the toolcasts and the way the toolcast management system 80 plays them (e.g., for toolcast maintenance).

For the opposite direction, when toolcast management system 80 sends information to underlying system 200, interface module 83 may simulate user actions within underlying system 200 (e.g., keyboard strokes, mouse moves, and clicks) and may provide the direct manipulation of underlying system 200 data structures (e.g., modifying displayed browser DOM of a website).

Figure 6:
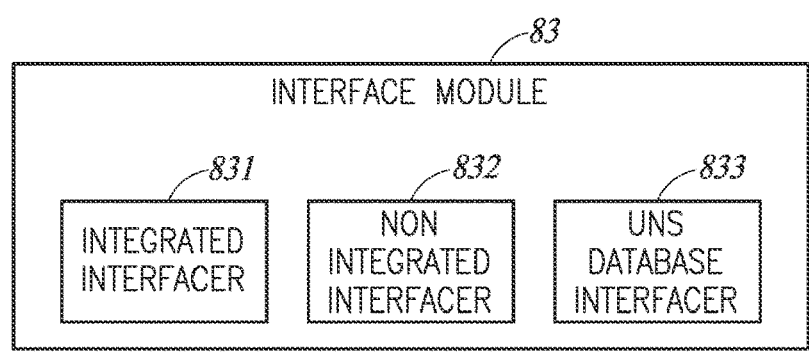
FIG. 6 is a schematic illustration of the elements of the interface module of FIG. 5, constructed and operative in accordance with the present invention.

Interface module 83 may also affect underlying system 200 behavior, modify the underlying system 200 display (e.g., through annotations) and generally provide input to underlying system 200. Reference is now made to FIG. 6 which illustrates the elements of interface module 83. Interface module 83 may further comprise an integrated interfacer 831, a non-integrated interfacer 832 and a UNS (underlying system) database interfacer 833.

It will be appreciated that the interfaces are not directly from/to the underlying system 200, but rather to/from the general system elements working with underlying system 200. For example, toolcast management system 80 may interface in both directions (via interface module 83) with the browser running an underlying website or with the development framework/WBS run-time modules running the website, but not with the underlying website itself.

Interface module 83 may interface with multiple underlying systems 200, thus its sub elements may support multiple targets using integrated interfacer 831 as described in more detail herein below.

It will be further appreciated that in some embodiments, underlying system 200 may include the infrastructure and the elements (or is otherwise adapted or modified) to interface with toolcast management system 80. These underlying systems are known as integrated underlying systems.

In other embodiments, underlying system 200 may not include the required infrastructure or elements to interface with toolcast management system 80. In these cases, toolcast management system 80 may be required to interface with underlying system 200 "from the outside", e.g., using external analysis, detection, injected hooks etc. as described in more detail herein below in relation to non-integrated interfacer 832. These are known as non-integrated or "external" underlying systems 200.

Some embodiments may combine the two, e.g., underlying system 200 may provide some interfaces, but not others, or underlying system 200 provides the interfaces but not all required parameters, information, or options. Toolcast management system 80 may also include multiple interfacing methods, some of which are integrated and some are not.

It will be appreciated that the interfacing and the integration may occur (fully or partially) at a different software level than the actual underlying system 200. For example, an underlying WBS may provide the required interfaces for toolcast management system 80 to handle websites implemented on the WBS. This would not require any modification or special code in the website itself (which is the actual underlying system 200). Other examples may include integration done at additional integration points than the underlying website, e.g., operating system, drivers, browser or JS engine. The integration can also be made with other development frameworks used to develop and deploy underlying system 200.

A partial alternative for integration with a WBS-based website underlying system 200 would include having actual integration done with the WBS used for the underlying website, but adding extra IDs, hints, metadata, or other associated information to the website itself.

Thus, using such methods, the toolcast management system 80 user may gain the benefits of an integrated solution, without requiring specific or substantial modifications to the underlying web site.

Toolcast management system 80 may also be implemented separately from the underlying system 200 (e.g., in a separate environment or on a separate physical or virtual platform). For example, on a mobile device, toolcast management system 80 may be implemented as a mobile application and underlying system 200 as a website (or vice-versa). Toolcast management system 80 may still interface with underlying system 200 (in an integrated or non-integrated manner) through a bridging mechanism that connects the two implementation environments (e.g., local communication, local web services, intermediary server hosted on the mobile device, browser extension implementation, local interface, etc.).

It will be appreciated that toolcast management system 80 may interface with an integrated underlying system 200 in multiple ways. Integrated interfacer 831 may (for example) interface to the WBS that was used to construct the underlying website (including specific web services or client-side integration points) Integrated interfacer 831 may use publicly available WBS server interfaces (APIs, Web services etc.). It may also use non-publicly available interfaces).

Integrated interfacer 831 may include a direct interface to the WBS server's internal document management system (which handles web page definitions storage and retrieval) or a WBS editor interface (which handles page and component editing).

Integrated interfacer 831 may also interface with an integrated underlying system through interfaces added in the source code of an underlying website, web server or application and through added parameters and hooks to the definition of experiments (such as AB or multivariate tests) used when deploying versions of underlying system 200. Such experiments are described in U.S. Pat. No. 10,733,078 entitled "System and Method of Handling Complex Experiments in a Distributed System" granted Aug. 4, 2020 and assigned to the common assignee of the present invention and incorporated herein by reference (when used in the context of an underlying WBS). It will be appreciated that in this scenario, there can be experiment-specific integrations and associations (e.g., have one toolcast associated with experiment option A and another toolcast associated with experiment option A).

It will be appreciated that such integration may include external website elements: As discussed herein above, websites may include external elements, such as external components, third party applications, verticals, sub-systems, add-ons, or other elements. Such elements may have sub-elements (including frontend and backend sub-elements) that may be hosted on the WBS vendor servers, separate third-party servers or cloud providers.

Integrated interfacer 831 may also implement integration with external site elements including the ability to handle toolcast triggers raised by such third-party elements (including use of their internal data, frontend, backend or other sub-elements). The external elements may also provide their own toolcasts (or toolcast sub-elements) associated with triggers. Such association may be with triggers from the main site code and triggers from the external site elements. The main website toolcasts may also include or reference such third-party toolcasts to create a complete toolcast flow.

UNS database interfacer 833 may interface with the underlying system 200 database to provide data to be used for analysis as described in more detail herein below.

Figure 7:
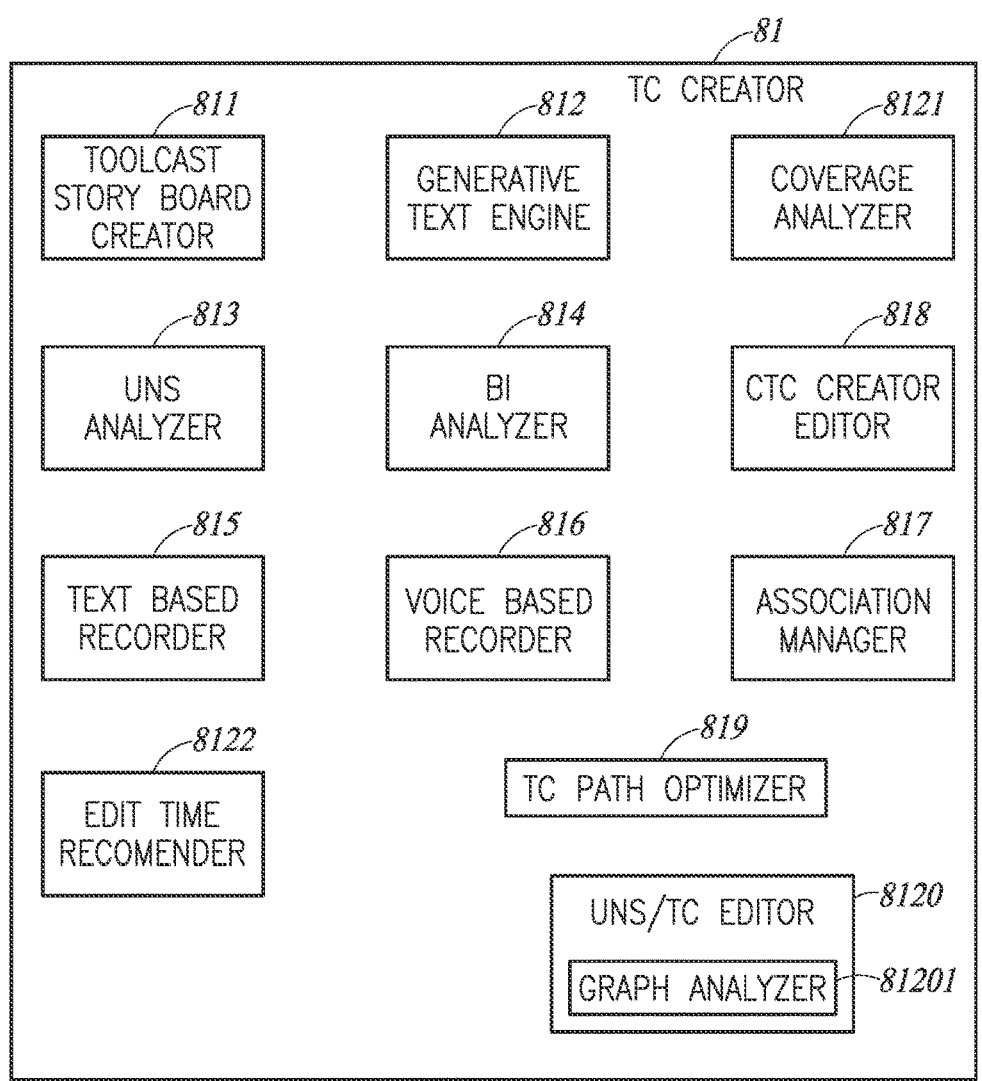
FIG. 7 is a schematic illustration of the elements of the TC creator of FIG. 5, constructed and operative in accordance with the present invention.

Reference is now made to FIG. 7 which illustrates the elements of TC creator 81. TC creator 81 may further comprise a toolcast storyboard creator 811, a generative text engine 812, a UNS (underlying system) analyzer 813, a BI (business intelligence) analyzer 814, a text based recorder 815, a voice based recorder 816, an association manager 817, a CTC creator and editor 818, a TC path optimizer 819, a UNS (underlying system)/TC (toolcast) editor 8120, a coverage analyzer 8121 and an edit time recommender 8122. UNS/TC editor 8120 may further comprise a graph analyzer 81201. The functionality of these elements is discussed in more detail herein below.

Association manager 817 may create toolcast associations for the interfaced configuration of toolcast management system 80 and underlying system 200 in both the integrated and non-integrated setups as shown in FIGS. 3A and 3B. It will be appreciated that the association can be explicit in the sense that underlying system 200 is modified to directly activate TC player 85 (e.g., through a function call, web services, added specific components which activate toolcasts, etc.). Such activation code can be added to the website itself or be part of the WBS used to construct the site (and just configured to make the specific toolcast activation calls). Such code would typically be required if the associations (and the underlying triggers) are related to internal site information (such as specific events in an underlying site data repository), as such events may be difficult to detect from the outside.

Association manager 817 may use toolcast IDs (or other naming or association mechanisms) to determine which toolcasts to activate. Underlying system 200 may pass these IDs as part of the trigger event, the TC player 85 may recognize the ID and activate the right toolcast.

Toolcast management system 80 may also be used with "external" (non-integrated) underlying systems 200 such as hand-coded sites. This is also relevant in cases in which toolcast management system 80 cannot directly modify or affect the site and its generation procedure, e.g., the user is creating a toolcast to a site for which the user has no editing permissions or to an application that is not a regular website. Such applications (for web, mobile or desktop environments) may be provided, for example, as a binary installation kit from an application store.

It will be appreciated that non-integrated interfacer 832 may use a different ("external") WBS that is not integrated with toolcast management system 80 and by using a different system that generates or edits code directly executable by the browser (e.g., HTML, CSS and JavaScript code). This could be a WBS that emits such code or an editor that allows the user to edit such code directly, such as DreamWeaver CC™ by Adobe or Notepad++ with HTML support.

Non-integrated interfacer 832 may also interface using a framework (such as React by Facebook, Inc.) that allows the user to create websites using a model different from the regular HTML/CSS/JS model. Such a framework may provide its own component architecture or language (such as React's JSX extensions to JavaScript).

Another form of implementation is sites using pre-installed or downloaded code. This could be, for example, an integrated applet (such as Java-based applets) which implements parts of the site, a full site interactive application (including mobile apps), or a virtual-machine based component. Such code can also include native code, JIT-compiled code, interpreted code, or code using other execution methods.

It will be appreciated that the site creation method may affect the way toolcast management system 80 interfaces with the site, and the way in which a toolcast association may be defined.

Non-integrated interfacer 832 may access the information and (possibly) some of the underlying object architecture of such an external site through the following methods (for example). It may access information by reading the site code (HTML/CSS/JS or otherwise) directly from the hosting server, by reading auxiliary files (such as the robots.txt file read by search engine spiders), by accessing the site through an API or a web service providing access to the stored pages, by accessing an external (non-integrated) WBS through an API or web services the WBS provides.

Non-integrated interfacer 832 may also access the traffic used to carry the evaluated website. This access could be through passive listening to (and analysis/decoding of) network communication, or through an agent embedded on the server, the client, a middleman machine (including these of a carrying CDN (Content Delivery Network), or an added "agent in the middle" which analyzed the relevant communication.

Non-integrated interfacer 832 may also use a specific browser (headless or not) which "runs" the target website and can intercept its (internal) object model or the rendered code, implement the relevant toolcast management system 80 elements as a browser extension or a plug-in to an existing browser or may analyze and modify the site's code on loading.

Another method used by non-integrated interfacer 832 to access information may be by injecting new or additional code into the site on loading. The injected code could be, for example, a client-side agent (embedded together with the site code) which interacts with its object model or rendering process. Alternatively, such an agent could interact with other system elements (such as the browser or the underlying operating system).

Non-integrated interfacer 832 may also add code or hardware which can track the visual display generated by the site. An example would be an added software agent on a mobile device that can read (at the operating system level) and analyze the displays generated by a given mobile application which don't have any "hooks" for regular interfacing.

Non-integrated interfacer 832 may also operate based on an analysis of the HTML, the browser object model, or both. However, UNS analyzer 813 may perform a preliminary analysis of the gathered information to extract a higher-level model of the site elements and structure. Such a model may include aspects that are structural (i.e., what the site consists of), layout related, semantic, and behavioral. In particular, the extracted model may include static information (e.g., the site structure at a given time) as well as dynamic information (the dynamic behavior of the site for various responses).

UNS analyzer 813 may perform a preliminary analysis using tools such as data-based rules, specific analysis scripts, and ML (machine learning) models such as the one described in U.S. Pat. No. 11,275,815 entitled "System and Method for Integrating User Feedback into Website Building System Services" granted 15 Mar. 2022, commonly owned by the Applicant and incorporated herein by reference. For sites created using non-integrated WBS's, the specific rules, scripts, and ML models may be adapted to specific WBS's. Thus, if a site, for example, is recognized as being built by a specific external WBS (e.g., WordPress), UNS analyzer 813 may adapt its preliminary analysis to take into account the specific elements of WordPress, such as its specific plug-in architecture.

UNS analyzer 813 may further analyze site structure, flow, code (client and server), BI information, editing history, and other repositories. The analysis may include geometrical, semantical, and usage analysis. It may integrate the information accessible through toolcast management system 80 with underlying system 200 (or the underlying system's WBS or development framework) as described herein above. It may include various forms of site analysis, understanding and learning as described in U.S. Pat. No. 11,275, 815.

Based on this preliminary analysis, non-integrated interfacer 832 may reconstruct the actual component structure of the underlying external WBS or framework (if such one was used). For example, the preliminary analysis may model and detect the use of a complex gallery in the external WBS generated site (e.g., by recognizing specific generated HTML/CSS/JS) and reconstruct such gallery from its rendered sub-components.

The analysis methods described above may also be used (when relevant) by TC player 85 to guide the TC player's elements that affect or modify the underlying website (as discussed in more detail herein below).

It will be appreciated that for sites analyzed by UNS analyzer 813 based on tracking the generated visual display as noted above, the analysis may be performed on the screen image-level rather than the HTML or browser object model level (e.g., recreating the component structure "behind" the displayed screen, even if we can't access this structure as in mobile application).

When using ML models, ML engines manager 88 may re-train the models for ML engines 882 on previously evaluated sites to adapt them (for example) to changes in an underlying external WBS. Data gatherer 881 may gather data from underlying system 200 as well as user information as described in more detail herein below.

The external detection of toolcast management system 80 of internal events occurring in underlying system 200 (e.g., in order to activate TC player 85) could extend to the detection of server-side or other site-internal events in some cases. This detection may depend on the server provider (e.g., cloud computing vendor) or the site owner providing the relevant access credentials to the toolcast management system 80 user, or possibly allowing the installation of relevant server-side monitoring software (or access to such installed server monitoring software). Such access may run as a separate parallel channel to the main communication between the underlying system 200 client and server.

It will be appreciated that toolcast management system 80 may be configured as a service (similar to other "X as a Service" platforms). In such a configuration, the toolcast management system 80 provider may create integrations with various other service providers (e.g., WBS providers, ISP's, TPA providers, etc.). Such integration may provide secure access via separate parallel channels, parallel to relevant underlying system 200-related systems and services. This can be done without providing direct access credentials to the actual toolcast management system 80 user (i.e., the person who creates and edits toolcasts).

In such a "toolcast management system as a service" configuration, the actual toolcast management system 80 functionality may be implemented on the actual toolcast management system 80 servers, other servers, the user's client machine, or a combination of these.

As discussed herein above, all of the interfacing methods above can be used for multiple required interfaces. These required interfaces may include recording of toolcasts, associating between toolcasts and site elements, events, and triggers (including defining the triggers), activation and playback of toolcasts, including mid-toolcasts interactions, various toolcast pre- and post-processing (such as optimization) and detection of underlying system changes that require toolcast modification or synchronization.

It will be appreciated that there are a number of methods to create toolcasts and edit them. The description below discusses possible procedures for creating linear (timeline-based) BTCs or BTC sections and creating more complex CTC covering a larger underlying system 200 (such as an entire website) or portions thereof. Such complex toolcasts may employ additional compositing methods, such as state charts, to create a complex toolcast. The description covers multiple methods of creation, including the creation of template toolcasts or complete ones, text-based recording, and voice-based recording.

It will be further appreciated that a single BTC or CTC may be spread over multiple locations (such as files, libraries, databases, repositories, servers or clouds). An example would be a top-level CTC that includes (separately defined) reusable sub-CTCs describing common components and templates included in underlying system 200.

The description below is generally focused on embodiments that have separate toolcast creation/editing and toolcast playback phases. However, in some embodiments, these phases may be intermixed. For example, TC creator 81 may automatically generate new or modified toolcasts during toolcast playback and may combine them in playback flow (or otherwise alter the currently playing toolcast). As another example, TC creator 81 may allow some users to enter editing during playback and modify the currently running or other toolcasts.

Toolcast storyboard creator 811 may provide for the automatic creation of toolcast templates. It will be appreciated that these toolcast templates from herein are referred to as "storyboards" rather than "templates" to distinguish them from WBS templates. Toolcast storyboard creator 811 may provide for the creation of automatically-generated storyboards for toolcasts (as well as semi-automatically-generated ones). Alternatively, toolcast storyboard creator 811 may be used to create full (filled-in) toolcasts based on the technology and structure described herein.

One way for toolcast storyboard creator 811 to create toolcasts and storyboards is based on a "dry run" made by the user. Toolcast storyboard creator 811 may allow a user to perform a "dry run" through the relevant parts of underlying system 200. Toolcast storyboard creator 811 may then record the user activities and provide the user with a template storyboard that includes the relevant structure and associations to underlying system events.

Instead of using an explicit "dry run", interface module 83 may also track the actual behavior of multiple regular runs of underlying system 200. This could be done within toolcast management system 80, or by underlying system 200 (or its execution infrastructure) through data collected as part of its operation. Based on this collected information, TC path optimizer 819 can determine which pathways are using underlying system 200, which elements are active, which interactions are allowed (and which are not), etc. This is similar to a navigation software (such as WAZE) collecting and analyzing traffic data to determine the actual underlying map and existing roads.

Toolcast storyboard creator 811 may further provide the user with placeholder areas in the text to be filled so to create the right descriptive narrative. The definitions of such areas may include information such as what should be described in them (e.g., a generated description of the underlying system 200 elements, flow, or functionality to be described in this area), the amount of text or voice-over time suitable for this area and hints provided based on hints in underlying system 200 or the templates included in it.

Placeholder areas may further include example generated text sections using a generative text engine (as discussed in more detail herein below), parameters, models, and instantiation data for use by machine learning (ML) models to fill the specific placeholder (and the toolcast in general).

In another embodiment, toolcast storyboard creator 811 may operate based on site templates used by an underlying WBS. These could include page section templates, component templates etc. Such toolcast storyboards could be pre-generated and possibly optimized based on feedback from edits made by toolcast creators.

Generative text engine 812 (using technology such as GPT3 or other ML-based natural language generating engines) may generate text for the storyboard (in full or sections inside a dry-run-based storyboard). Generative text engine 812 may be trained and run based on material from the different sources, or based on analysis of available information. Such sources and analyses may include information and descriptions provided by the user (through text chat, voice instructions, answers to generated questions etc.), underlying template(s) used to generate the site, previous toolcasts created by the same user, toolcasts created for other parts of the website and toolcasts created for the underlying templates or sites using them (subject to anonymity, privacy and IP rights of the toolcast owners when relevant).

Generative text engine 812 may further also use the results of UNS analyzer 813 which may analyze the elements of underlying system 200, or may analyze gathered information by data gatherer 881 using ML engines 882 to determine how actual users use the site. Such analysis may involve internal underlying system 200 information (e.g., website DOM) and external information (e.g., screen images of displayed website screens).

Generative text engine 812 may further use the results of BI analyzer 814 which may analyze underlying WBS collected business intelligence (BI) information (or that collected by an underlying website hosting system). It may also include specific BI gathered by data gatherer 881 (e.g., by listening to the underlying system 200), which may require (and gather) a different level of detail, possibly gathering all mouse, keyboard, and other UI interactions.

UNS analyzer 813 may also analyze external information related to the underlying system 200 which may include articles, description, specifications and other technical information related to underlying system 200.

Generative text engine 812 may also use user provided directions to which areas of the site to create toolcasts for and in what order, as well as additional feedback and answers provided by the user in response to questions provided by generative text engine 812. The interaction with the user could take multiple forms, including explicit use of questionnaires and forms, use of text chat, use of voice chat, sensor feedback (e.g., gesture recognition), etc.

Generative text engine 812 may further use user-recorded sessions of TC creator 81 without added information (a "dry run" as discussed herein above). Another source may be BI gathered by data gatherer 881 (working in conjunction with interface module 83) describing end-user use, events, and data paths through underlying system 200. Such analysis by UNS analyzer 813 could include, in particular, detection of areas of underlying system 200 in which end-users are having difficulties in using underlying system 200 (e.g., based on analysis of user behavior and paths taken). Such located areas may serve as focal points with which toolcasts may be associated.

Generative text engine 812 may further use underlying user data stored in underlying system 200 and information from support calls and support tickets related to underlying system 200. Such information may include recording or extracted information from actual support sessions for underlying system 200 (e.g., using the support person feedback as a "trainer voice").

It will be appreciated that toolcast storyboard creator 811 may also use the user's feedback and further edits made by the site designer to train the ML models controlling the generation of storyboard elements and action associations as described in more detail herein below. Such feedback may include both changes made to the suggested toolcast (by the designers), as well as feedback on the use of the toolcast by the site viewers (toolcast consumers). The feedback could also include feedback from additional (separate) reviewers. The feedback integration may create a feedback loop which further improves the generated toolcast quality.

Toolcast storyboard creator 811 may take additional steps to understand what the user "needs" to do in underlying system 200 and the best way to convey the relevant knowledge to achieve these needs. In particular, toolcast storyboard creator 811 may employ ML models via ML engines manager 88 to break the appropriate underlying system 200 actions into steps, guide the user through these steps, and let the user do the work by himself or herself if possible.

Thus, toolcast storyboard creator 811 may generate, modify, or operate toolcast segments as appropriate (including during playback using a user interaction module as described in more detail herein below). Toolcast storyboard creator 811 may also re-connect, re-arrange, or re-configure an existing BTC dynamically based on the user interaction with the toolcast. For example, if a user goes over a tutorial toolcast quickly, toolcast management system 80 may play the BTC more quickly or use more succinct or advanced BTCs instead of the usual ones.

It will be appreciated that the functionality of toolcast storyboard creator 811 as described herein above is oriented at text-based toolcast creation and editing. However, an alternative embodiment, toolcast storyboard creator 811 may provide equivalent capabilities for voice-based editing (discussed in more detail herein below). In such an embodiment, voice placeholders can be filled with voice recording, and generated text is read via text-to-speech and possibly modified to replace some sections with recorded voice segments.

As discussed herein above, toolcast storyboard creator 811 may also generate complete toolcasts, including the flow definition (linear/BTC or graph/CTC) and the required media (text, voice, etc.).

It will be appreciated that BTC recording and editing is typically tied with the UI and flow of underlying system 200, as the BTC reflects sequences of UI actions and activities. Toolcast management system 80 may use known methods to create and edit BTCs (such as defining the BTC through a standalone IDE). However, better results can be achieved through a BTC creation environment integrated underlying system 200. Two such environments (text and voice-based) are described below in relation to text based recorder 815 and voice based recorder 816.

It will be further appreciated that the recording/editing environment provides real-time feedback. Since both text based recorder 815 and voice based recorder 816 may run on top of underlying system 200, the user may immediately interact with the result. For example, operations on an underlying site generate a precise site response (e.g., the response the user would have received under normal use conditions).

Figure 8:
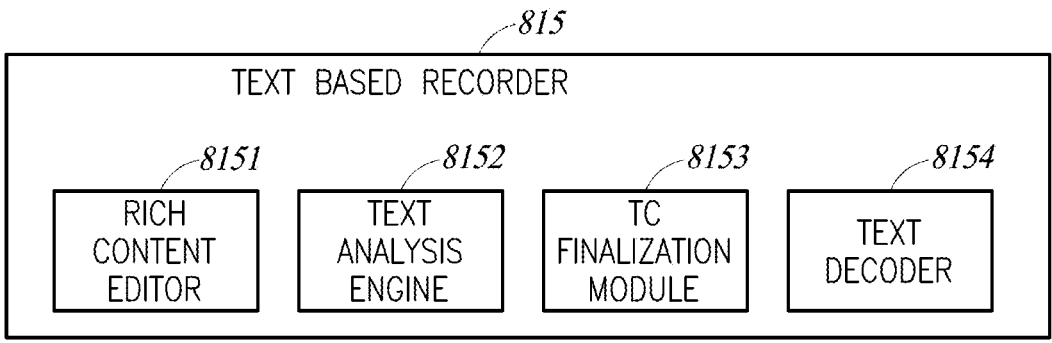
FIG. 8 is a schematic illustration of the elements of the text based recorder of FIG. 7, constructed and operative in accordance with the present invention.

Reference is now made to FIG. 8 which illustrates the sub elements of text based recorder 815. Text based recorder 815 may further comprise a rich content editor 8151, a text analysis engine 8152, a TC (toolcast) finalization module 8153 and a text decoder 8154.

Figure 9:
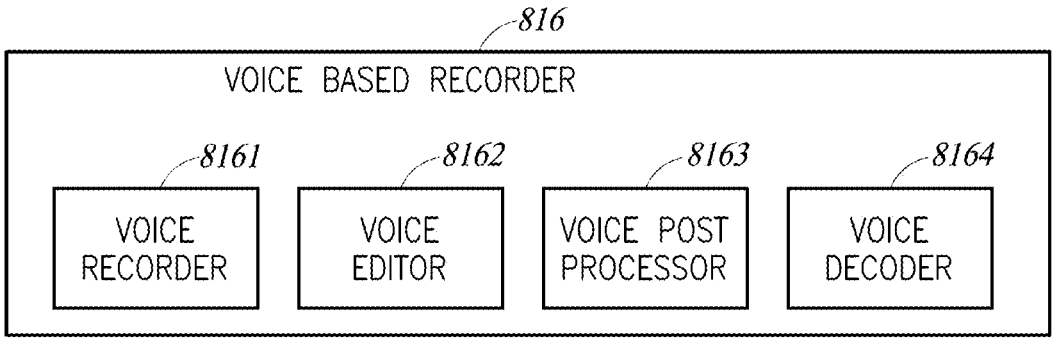
FIG. 9 is a schematic illustration of the elements of the voice based recorder of FIG. 7, constructed and operative in accordance with the present invention.

Reference is now made to FIG. 9 which illustrates the elements of voice based recorder 816. Voice based recorder 816 may further comprise a voice recorder 8161, a voice editor 8162 a voice post processor 8163 and a voice decoder 8164.

Text decoder 8154 and voice decoder 8164 may decode the user's entered text or speech and point to relevant elements or actions based on knowledge of interaction with underlying system 200 and the current user context. TC creator 81 may also provide toolcast specific auto-completion. Such auto-completion can be higher level than that offered by typical IDE's, for example it may include auto-completion of activities and WBS operations.

Text based recorder 815 may enable the creation of toolcasts using a specialized rich text editor as the primary editing environment. The ability to create and edit interactive video-like tutorials using text editing makes TC creator

81 a substantially quicker and simpler solution compared to existing tools for the creation of training, documentation, and support materials.

It will be appreciated that the steps involved in creating a toolcast by the user (which may be site designer/instructor/creator/audio professional) may include creating the text to be used as the underlying training material using rich content editor 8151. This text can be delivered via voice-over, subtitles, or other ways. This text may form the "storyboard" of the created toolcast.

Rich content editor 8151 may be used to associate system events with words in the text with events, similar to how one would mark text attributes (e.g., bold or italics). These associated events may include events that drive underlying system 200, such as mouse moves and clicks, text entry etc. or events that affect underlying system 200 screen display, including component highlighting or displaying additional elements (e.g., arrows).

Rich content editor 8151 may also add text markers which control the audio generated based on the text. These can use, for example, markers defined in the SSML (Speech Synthesis Markup Language) standard.

It will be appreciated that the UI of rich content editor 8151 may provide a graphical representation of these associations. For example, similar to how a display attribute or link is represented in rich text, the UI may display a small image of the related target location (e.g., associated UI element) near the text. Background color or frame may represent the connection type. When the user hovers or selects the text linked to the association definition, the UI may open a popover to edit the target location or association configuration. Further text editing may preserve the added information. For example, text moving (e.g., via copy/paste) will also transfer the added enriching elements.

It will be also appreciated that the association definitions may include additional configuration information, attributes, and parameters.

Text based recorder 815 may provide tools and environments to support the event association process. For example, text based recorder 815 may provide a tool to identify displayed website components to be the association's target.

For example, when creating a toolcast for a text editor underlying system, the user may highlight a section of text in the underlying text editor. In this scenario, rich content editor 8151 may highlight relevant UI options in underlying system 200, may cause underlying system 200 to display relevant pop-up menus and highlight their options and may provide a list of possible and relevant underlying system 200 UI actions.

Toolcast management system 80 may implement such tools using (for example) a browser extension or plug-in or as a function of a WBS used to implement or host an underlying web site.

Text based recorder 815 may provide additional levels of automation to this process. Text analysis engine 8152 may analyze the text of the provided storyboard and automatically suggest relevant element association and actions (i.e., detect what we are talking about). For example, the storyboard may specify "press the [continue] button", and the analysis may create the association between this text segment and the operation of clicking on the relevant [continue] button in the right place in underlying system 200. Such associations may be fully automatic or may be subject to approval by the user.

It will be appreciated that text analysis engine 8152 may analyze in the context of the current website display. Thus, it can provide more specific and focused results than general-purpose text analysis (e.g., only currently visible website elements may be relevant).

Text analysis engine 8152 may also benefit from a separate analysis of an underlying website (WBS-based or not) structure and flow, possibly including frontend, backend and procedural elements. Text analysis engine 8152 may correlate the result of the analysis with the results of the text-based analysis. Thus, if (for example) the website calls for button A to be pressed before button B, text analysis engine 8152 may associate unspecified buttons (referenced in the text) with buttons A and B according to their order, i.e., correct a situation in which the user did not name the buttons to be pressed in the text.

It will be appreciated that for WBS-based websites, an ML engine 882 can be trained on common templates provided by the WBS using ML engines manager 88. This training may include the specific features associating a given site with the underlying templates used to construct it (as a site may include elements from multiple templates). Thus, text analysis engine 8152 may benefit from such training and information.

It will be further appreciated that the toolcast text representation may be edited using rich content editor 8151 similar to the editing of a regular rich text document. Deleting, moving, and copying text segments may modify the associated events as well. Thus, if (for example) a text segment is duplicated, a set of matching and synchronized actions would be duplicated as well.

TC creator 81 may also create additional toolcast elements. For example, toolcast management system 80 may generate voice-over speech from the provided text via a text-to-speech engine (or, conversely, allow the user to dictate some of the text via a speech-to-text engine and possibly integrating the text-based editor with the speech-based editor described below).

Once a toolcast definition is complete (including the storyboard text and the related association definitions) TC finalization module 8153 may finalize the toolcast.

TC finalization module 8153 may convert the storyboard text to speech (e.g., via a text-to-speech engine) or to a set of subtitles located in the relevant positions on the screen (or both).

TC finalization module 8153 may also calculate the appropriate timing for words in the script. TC finalization module 8153 may run the toolcast in a measurement mode, and determine start and end time for every word in the toolcast text as converted to speech (to create a finalized timeline of events and sound/subtitles for the toolcast). An alternative embodiment may use other speech units such as syllables or sentences.

Such running may have a "variable speed", i.e., sometimes the speed is set by the reasonable speed of speech generation, and sometimes it is set by execution times of underlying system 200 (i.e., the speech has to wait for the system to finish). It will be appreciated that such running may be made in a specific underlying system 200 mode which prevents the running from having persistent side effects (as discussed in more detail herein below).

It will also be appreciated that this finalization is separate from the toolcast publishing process (described in more detail herein below). TC finalization module 8153 may be run on the underlying system's client, server, a separate server, or a combination thereof.

Voice based recorder 816 may enable users to record themselves and then convert the recording into a toolcast file so that recording could be replayed. This flow may be more natural and easier to operate for some users, rather than writing text. The resulting recording can also be converted into the toolcast rich text format to be later edited with text based recorder 815.

Thus, the user may record themselves while using underlying system 200. Voice recorder 8161 may record both the audio and the actions underlying system 200. This may be augmented with additional elements (such as added visual highlighting on underlying system 200).

Voice editor 8162 may then use speech-to-text to convert the audio to text and get the timing of the start and end of each word (or other text sections). Voice editor 8162 may convert the raw user events into relative-to-element toolcast ready events. Voice editor 8162 may generate a rich-text representation of the recorded toolcast (together with associated actions).

Toolcast management system 80 may also support audio-based recording using a two-phase method (similar to the use of toolcast storyboard creator 811 above). Under this method, underlying system 200 is recorded (without a voice-over), and the voice-over is added in a separate follow-up phase. Voice based recorder 816 may provide the user with preliminary timing information, so as to help the user plan the voice-over.

It will be appreciated that voice based recorder 816 may provide voice-oriented editing. For example, voice editor 8162 may allow the user to replace a given segment of the recording with a newly recorded segment "over" the existing voice segment.

Voice post processor 8163 may provide relevant post-processing capabilities, such as voice quality improvement, removal or shrinking of "dead" segments, removal of "fluff" speech such as "Oh", background noise removal, etc. Such operations may be adapted to the existence of associated actions and the functioning of underlying system 200. Thus, a silent recorded section may not be automatically removed if there are system actions (including one not affecting the display) occurring in parallel, which required the gap in the speech.

It will be appreciated that the tools described herein above support the creation and editing of linear BTCs. CTC creator and editor 818 may be used to create and edit CTCs containing one or more BTCs, or a hierarchy of such CTCs, and associate them with specific events and triggers occurring in underlying system 200.

Figure 10:
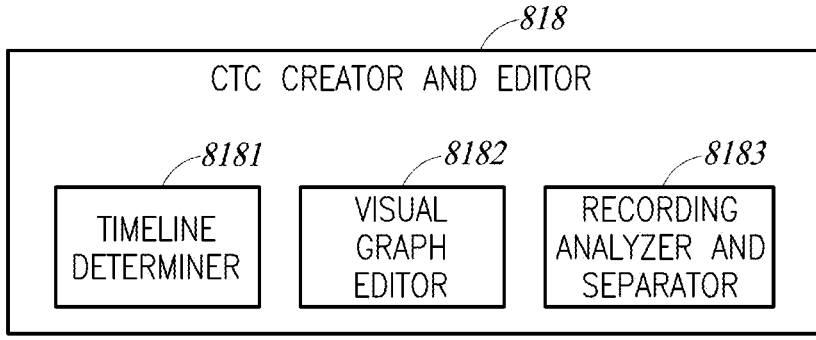
FIG. 10 is a schematic illustration of the elements of the CTC creator and editor of FIG. 7, constructed and operative in accordance with the present invention.

Reference is now made to FIG. 10 which illustrates the elements of CTC creator and editor 818. CTC creator and editor 818 may further comprise a timeline determiner 8181, a visual graph editor 8182 and a recording analyzer and separator 8183.

It will be further appreciated that the CTC definition specifies the CTC flow and the events and triggers with which CTCs and BTCs are associated (as discussed herein above).

Timeline determiner 8181 may determine the way actions are performed based on timelines or detected website events. This can affect the higher-level CTCs (e.g., determine how and when different elements of the CTC are executed) and may also affect the underlying BTC's (i.e., affect the way specific BTC's are executed).

The CTC definition may include linear timelines (for BTCs as well as CTCs), state charts, activity graphs (including multi-level graphs), script definitions (using a script or a programming language), or other mechanisms.

In one embodiment, the flow may be defined using one or more state charts. These state charts describe when a toolcast element is played and under what conditions, as described in more detail herein below. Visual graph editor 8182 may provide a visual state chart editor that allows the editing of charts and their integration with underlying system 200.

Visual graph editor 8182 may include support for editing of directed graphs, multi-level graphs (i.e., graphs whose nodes contained sub-graphs) and multigraphs (in which node pairs can have multiple connecting edges).

In another embodiment, recording analyzer and separator 8183 may create a linear CTC from a single recording by intercepting clicks or meaningful actions and separating the linear recording to multiple BTCs connected by those actions.

It will also be appreciated that in some cases, the mapping between underlying system 200 navigation and CTC structure (e.g., state chart graph structure) will not be obvious or automatically determinable. Visual graph editor 8182 may thus consult with the user to determine the right structure and navigation. This can be done by offering alternatives (that can be rejected, accepted, or modified), by asking one or more questions, or by other means.

For BTCs, the underlying graph may be a simple one (e.g., a linear sequence of nodes, possibly with some entry points, exit points, or branching to skip certain sub-sequences). However, the same technology and interface described for CTC may still be applicable to BTC editing.

It will be appreciated that the recorders and editors described herein above generally record user's actions within underlying system 200, for example, when using voice-based toolcast generation or using a dry run method. Such recording is typically direct, i.e., recording the actual user interaction with underlying system 200 and converting this interaction into definitions of the relevant events, triggers and timing information (with which the toolcasts are associated).

However, such recordings may not include the best way to perform underlying system 200 tasks as envisioned by the user. The user may have performed extraneous or erroneous steps, may have missed a required step and returned to it later (which may confuse the toolcast viewer), or may have re-traced his or her steps.

Thus, TC path optimizer 819 may analyze the user's steps to create an optimized, canonical, or cleaned-up version of the user's activity. Such analysis may be implemented in a number of ways, including techniques from the realm of code optimization (e.g., as used in compilers).

Figure 11:
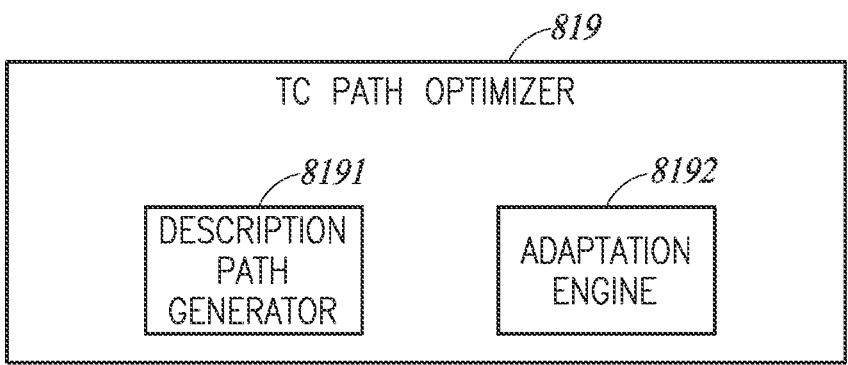
FIG. 11 is a schematic illustration of the elements of the TC path optimizer of FIG. 7, constructed and operative in accordance with the present invention.

Reference is now made to FIG. 11 which illustrates the elements of TC path optimizer 819. TC path optimizer 819 may comprise a description path generator 8191 and an adaptation engine 8192.

TC path optimizer 819 may use ML engines 882 to analyze (and be trained on) the underlying system 200 structure, the steps taken by the user, the steps taken by end-users of the same system (e.g., through collected BI information) and the steps taken by end-users of other sites using similar templates (subject to anonymity, privacy and intellectual property (IP) rights of other users).

ML engines 882 may further analyze and be trained on hints provided by the template designers (e.g., predefined per-template path definitions in a WBS setting), content or explicit hints provided in other technical materials associated with the relevant underlying system 200 sections. Such materials may include design, specification, documentation, training, or support very possibly create alternative, optimized or simpler path to execute the same capability or flow.

Description path generator 8191 may generate descriptive information/explanation on how the optimization was performed, i.e., how the suggested alternative flow (or the changes made to the user-specified recoded flow) provides the results while being better or optimized. Such an explanation may be based on mapping between the recorded flow and the modified flow.

Adaptation engine 8192 may adapt additional elements of the toolcast in conjunction with the changes made to the recorded path. Such adaptations may affect the definition of events triggers, the ACEs, etc. The transformation may include the reordering of elements, the removing of elements that became redundant, unnecessary, or otherwise "orphaned" and the modifying of actual content of elements to conform to the modified paths (e.g., through analysis and subsequent generation of various ACEs such as text, image, voice, or video content).

Adaptation engine 8192 may directly perform the changes or create a change plan (e.g., presented as a task list) to be evaluated by the user and accepted, rejected, or further modified. The user's response in such a case can provide additional feedback for the training of adaptation engine 8192.

It will be appreciated that integrated UNS/TC editor 8120 may provide integrated editing or combined editing of a given underlying system 200 together with its toolcasts. Such integrated editing could help the underlying system 200 designer to keep the two synchronized. UNS/TC editor 8120 may comprise a graph analyzer 81201.

It will be further appreciated that the underlying system 200 to toolcast relationship is a many-to-many relationship. A single underlying system 200 may have multiple associated toolcasts (e.g., for different components and sub-systems). Such toolcasts may be united under an "umbrella" top-level CTC, but not necessarily so.

A single toolcast (e.g., for a common component) may be associated with multiple underlying systems 200 (e.g., multiple underlying websites using the same template, using the same component, or multiple instances of the same underlying system 200).

As discussed herein above, toolcasts are typically graph-structured objects (or, more precisely, multi-level graphs). This is the case with both CTCs (which may be described using a graph-based state chart) and BTCs (which may also have a graph representation).

Underlying system 200 may also be described as a graph (or possibly a multi-level graph) and graph analyzer 81201 may determine interconnections between displayed pages and possibly between sub-areas or components of single pages (for which a flow is defined).

It will be appreciated that the navigation between nodes of the underlying system 200 graph may be explicit or implicit. For example, explicit navigation may be based on direct hyperlinks between different pages of an underlying website. Implicit navigation may be based on the navigation target (e.g., URL) generated based on analysis, calculation, search results, or external database information.

For explicit navigation, graph analyzer 81201 may determine graph arcs based on static analysis of the underlying system 200 (e.g., from hard-wired "href" links in an underlying website). For implicit navigation, graph analyzer 81201 may determine the underlying system 200 graph arcs (e.g., web page transitions) using dynamic (run-time) analysis of displayed components, user flow, and other information collected at run-time.

Both underlying system 200 and the toolcast graphs may be disconnected, i.e., consist of multiple disjoint sub-graphs. This can occur for an underlying system 200 when (for example), underlying system 200 includes multiple websites presented based on external parameters (e.g., time of year, detected user segmentation based on geography, user type, etc.).

Integrated UNS/TC editor 8120 may allow concurrent editing of underlying system 200 and the associated toolcasts i.e., a combined underlying system 200 editing functionality (e.g., an underlying WBS visual editor) and toolcast editing (e.g., CTC graph/state chart editor). Integrated TC/UNS editing may be based on matching between the underlying system 200 graph and the TCs graphs so that the two graphs can be edited in parallel. Thus, for example changes made to one of the graphs can be mirrored to the other graphs, e.g., based on analysis of the similarity (homomorphism) between the graphs. Furthermore, areas modified in the underlying elements of a node of one graph (e.g., a website page) can cause matching nodes in the other graph to be marked for maintenance (e.g., the matching toolcast for that page).

Integrated UNS/TC editor 8120 may also suggest (via association manager 817) automatic associations between underlying system 200 and toolcasts which can be rejected, confirmed, or edited by the user.

Coverage analyzer 8121 may detect areas in which a mismatch exists between underlying system 200 and the toolcasts and point them to the user, e.g., to allow the user to correct the situation through changes to either underlying system 200 or toolcasts. These could be areas that lack coverage, situations of overlapping toolcast coverage, areas in which underlying system 200 and the toolcasts are not synchronized, use of similar sub-elements with different toolcast coverage etc. Coverage analyzer 8121 may check the toolcast coverage of pages, components, associated procedural code, and other units of underlying system 200. It may also determine what is missing in the toolcast. Coverage analyzer 8121 may use an analysis of toolcast text or speech to detect mentioned elements not covered in the toolcast definition.

Edit time recommender 8122 may offer editing hints and options to the toolcast designer. Edit time recommender 8122 may be trained based on activities of users of underlying system 200 (or its underlying development framework or WBS) and toolcast management system 80.

An example of the use of integrated UNS/TC editor 8120, is the ability of the user editing the toolcast to add toolcast nodes and immediately associate them with the right nodes and events in underlying system 200. Visual graph editor 8182 may also be integrated with the various toolcast recorders described herein above (such as text based recorder 815 and voice-based recorder 816).

It will be appreciated that one issue toolcast management system 80 needs to address is how to maintain the toolcasts when underlying system 200 has been modified. This also includes what to do in case a toolcast is activated and underlying system 200 does not match the reference defined in the toolcast at any given level. This could occur, for example, if the required maintenance operations have not been performed (correctly or at all). Such changes may result from changes to underlying system 200 itself and changes to the underlying system 200 deployment and run-time environment (e.g., change to the underlying operating system or to dynamically linked code used by underlying system 200).

It will be appreciated that underlying system 200 is often developed (and deployed) using a development framework. This development framework may be framework based on and providing continuous integration (CI) and continuous deployment (CD) services. For the purpose of the discussion below, WBSs can be regarded as a category of development frameworks.

Maintenance module 87 may resolve the maintenance and matching issues mentioned above, and may be integrated with the development framework of underlying system 200. This way, maintenance module 87 may automatically recognize when a toolcast will break based on analysis of changes in underlying system 200 (e.g., changes to its layout, flow, content, or data).

Such integration may be achieved in any of the manners described herein above, such as the use of specialized interfaces (e.g., web services) or a toolcast management system 80 deployment agent or plug-in integrated into the development framework.

To accommodate for possible toolcast breaks, toolcast management system 80 may offer elements providing fallbacks, notifications, and break severity detection as further detailed herein below. This may be done in both TC creator 81 and TC player 85.

Figure 12:
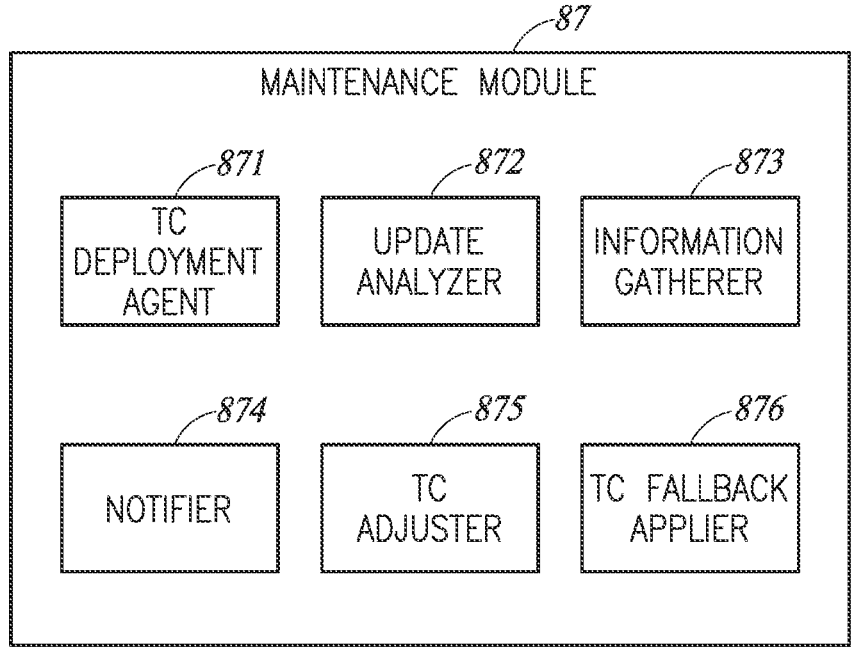
FIG. 12 is a schematic illustration of the elements of the maintenance module of FIG. 5, constructed and operative in accordance with the present invention.

Reference is now made to FIG. 12 which illustrates the elements of maintenance module 87. Maintenance module 87 may further comprise a TC (toolcast) deployment agent 871, an update analyzer 872, an information gatherer 873, a notifier 874, a TC (toolcast) adjuster 875 and a TC (toolcast) fallback applier 876.

TC deployment agent 871 may be added to the elements of underlying system 200 in the development framework (e.g., as an additional module). TC deployment agent 871 may be a generic agent, which may only be configured via the relevant underlying system 200 app ID (or other metadata). TC deployment agent 871 may fetch additional configuration information related to the toolcast project, e.g., from a server providing the toolcast management system 80 services.

TC deployment agent 871 may be activated when a underlying system 200 change is about to be deployed. Update analyzer 872 may perform an analysis to detect the toolcast elements that are broken or otherwise not working. The analysis may provide information on the level of breaking of the toolcast. A break could relate to specific BTCs, or affect larger parts of the toolcast.

Update analyzer 872 may perform at the structure level, i.e., analyzing whether elements in underlying system 200 corresponding to the toolcast were modified in general. This analysis may include when and where given structure changes were made as well as conformance of IDs and timestamps. The analysis may also analyze content and intent—does the toolcast describe a given underlying system 200 element that has been modified or removed. Update analyzer 872 may also perform recognition and analysis of the toolcast and underlying system 200 content. In the specific case in which toolcast management system 80 is integrated with a WBS hosting an underlying website, information gatherer 873 may interface with the WBS's document management sub-system to get direct information on what has been modified in the underlying website. Alternatively, information gatherer 873 may retrieve different versions of the underlying site (with information in their WBS object form), and compare the versions to detect the changes.

The second scenario above may be relevant, for example, when a toolcast attached to site element A describes site element B (which has no directly associated toolcast). For example, it could make more sense to explain B in conjunction with A that is semantically related to B (rather than B itself). In such a scenario, update analyzer 872 may provide the required information.

It will be appreciated that update analyzer 872 can be supported by developer-provided hints. For example, by defining in A's toolcast configuration information that this toolcast is also related to B and not just to A. Based on this analysis, update analyzer 872 may determine which toolcast elements (CTCs or BTCs) should be modified and in what ways.

Notifier 874 may notify underlying system 200 or the toolcast developer of any such updates. This may include generating explanatory media related to the relevant toolcast.

TC adjuster 875 may provide automatic correction or adjustment to the toolcast itself (e.g., adjustment to position hooks or timing information).

TC fallback applier 876 may apply a fallback to some or all of the toolcast elements. TC fallback applier 876 may also disable toolcast playback for some or all of the underlying system 200's elements and may shut down toolcast management system 80 (e.g., until the toolcast is updated).

TC fallback applier 876 may use alternative technology to convey the relevant content through alternative means, such as a regular video explaining the relevant underlying system 200 site section.

UNS analyzer 813 and/or update analyzer 872 may also analyze underlying system 200 state mapping information for use by TC player 85 as described in more detail herein below.

It will be appreciated that the underlying system 200 developer may manage multiple versions and configurations of underlying system 200 in the underlying system 200 development framework. These could include serial versions (following each other in time), parallel configurations (multiple co-existing variants) and interim versions (still under development).

Toolcast management system 80 may maintain toolcasts matching these multiple versions and configurations, e.g., based on version/configuration ID.

Such parallel configurations of underlying system 200 may include A/B or multivariate tests, which provide multiple versions of the underlying code. As some A/B tests may be open for a substantial period, the underlying system 200 developer may create multiple toolcast elements for the multiple A/B test branches (e.g., the UNS would display a different TC element for each test variant). In fact, the toolcasts themselves could be the subject of the A/B test, testing which toolcast provides for better use of the relevant underlying system 200 section.

In these cases, TC creator 81 and TC player 85 may interface with the test management system handling underlying system 200 (such as the one described in U.S. Pat. No. 10,733,078).

It will be further appreciated that such parallel configurations on underlying system 200 may also include multiple language versions (translations) of the toolcasts. Toolcast management system 80 may support multiple matching translations of a given toolcast (including text translation and event relocation) based, for example, on a translation UI extension, which allows entry of multiple language versions for the displayed ACEs (including multiple all media types).

Figure 13:
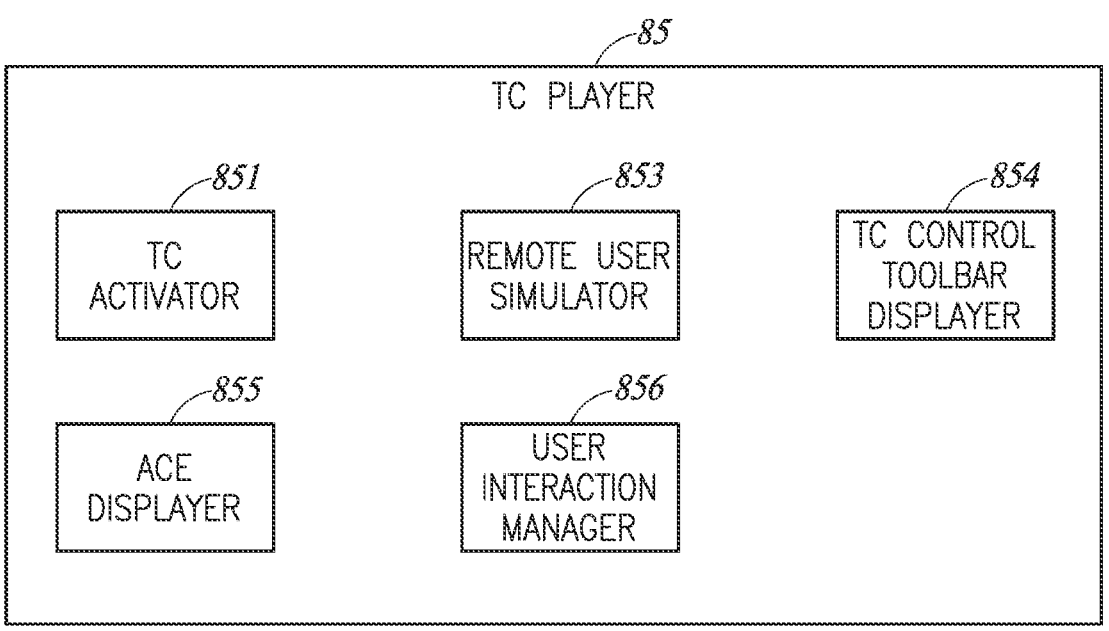
FIG. 13 is a schematic illustration of the elements of the TC player of FIG. 5, constructed and operative in accordance with the present invention.
Figure 14:
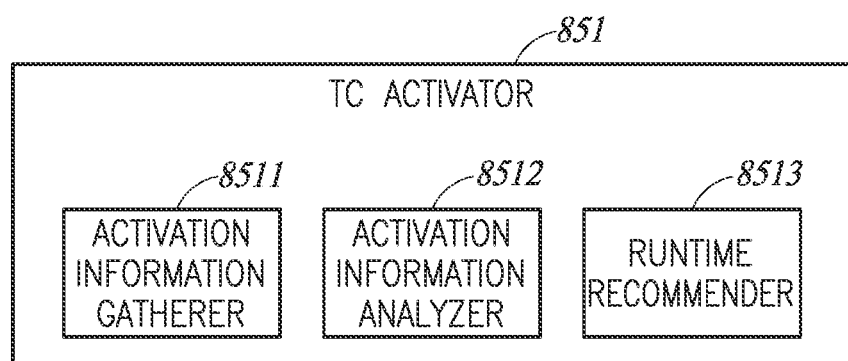
FIG. 14 is a schematic illustration of the elements of the TC activator of FIG. 13, constructed and operative in accordance with the present invention.

Reference is now made to FIG. 13 which illustrates the elements of TC player 85. TC player 85 may comprise a TC (toolcast) activator 851, a remote user simulator 853, a TC (toolcast) control toolbar displayer 854, an ACE displayer 855 and a user interaction manager 856. Reference is now made to FIG. 14 which illustrates the elements of TC Activator 851. TC activator 851 may further comprise an activation information gatherer 8511, an activation information analyzer 8512 and a run-time recommender 8513.

It will be appreciated that TC activator 851 may provide for explicit activation of toolcasts by the user (e.g., by pressing a specific button) and may also provide for automatic activation of toolcasts, i.e., TC activator 851 runs in the background and activates toolcasts automatically as described herein below.

TC player 85 may run toolcasts dynamically on the user's underlying system 200 based on the user's state and data, and triggers and events in underlying system 200. This running could include the activation of separate toolcasts or the activation and entry using a given entry point (graph node such as state chart node) in a given multi-node CTC.

TC activator 851 may be fully automatic or may require user confirmation. The latter may be especially relevant when multiple toolcasts may be activated (or are otherwise available) for a given underlying system 200 area or under specific conditions and system states.

When making toolcast activation or navigation decisions, TC activator 851 may take into account information gathered by activation information gatherer 8511 from multiple sources, such as the state of the underlying system 200 including the currently displayed page, internal state information, and what is displayed at any moment and any internal databases and repositories of underlying system 200 (or the system hosting it), including BI information, data about the site (including design, layout and site data) as well as data about the specific user.

TC activator 851 may also take into account the state of the user as determined from the available information. In an integrated system, this information may include separately gathered user-related information by activation information gatherer 8511 from underlying system 200, including user information not related to the specific website (e.g., integrated WBS information on the user in general, not just a specific hosted website).

It will be appreciated that the activation of toolcasts by TC activator 851 may be performed based on associations (as discussed herein above). Such associations may also include conditions and rules for activations. These conditions and rules can activate toolcasts based on the various events occurring in underlying system 200 (e.g., the user's website) or outside of it, as well as underlying system 200 data as analyzed by activation information analyzer 8512. These may include user actions, such as button press, mouse hovering near a component, flow in underlying system 200, etc. and pressing a link from the underlying system 200. This pressing may open a site page with a toolcast being active. The link could be a generic link in the site, or a specific one related to the toolcast.

Toolcast activation may also be through an API, a web service or other interface type available to underlying system 200. Via interface module 83, TC activator 851 may implement its own logic for when to trigger and activate toolcasts, separate from any logic and associations implemented by toolcast management system 80.

For an underlying system 200 that is a website, activation information analyzer 8512 may analyze the website's DOM and state information (as well as underlying system 200 information or user data), and deriving information which can be translated into a toolcast node to open.

TC activator 851 may further activate through a predefined initial node(s) which could be associated with points in underlying system 200 or from the results of activation information analyzer 8512 looking at the screen from outside visual analysis in addition to internals/DOM analysis. A number of such analysis algorithms are described in U.S. Pat. No. 11,275,815.

Activation may be based on server-side information about underlying system 200 or stored by it, proactive analysis, an analysis of user behavior by activation information analyzer 8512 such as "is the user stuck or having problems in a specific underlying system 200 area" (so we could activate a "shadow" toolcast, which is not activated in regular situations).

Activation information analyzer 8512 may also determine for activation, user-related metrics, parameters, and events. This could include analysis of user metrics such as voice-based emotion analysis and voice-based triggers. These could be based on direct voice commands, as well as voice analysis which indicate stress, frustration, etc.

Activation may also be triggered via detection related to the user, e.g., via sensors, gesture analysis, etc., by other events or conditions which can be detected through the toolcast management system 80/underlying system 200 interfaces described above or by interactions with underlying system 200 or by toolcast management system 80 itself (including any mouse, keyboard, voice, or other interactions).

Run-time recommender 8513 may select which CTC to activate. Run-time recommender 8513 may be rule or ML-based and may use the association and other information and events described herein above.

Run-time recommender 8513 may also make explicit recommendations to the user (rather than to the internal flow engine) which toolcasts are best to run at a given point in time. Run-time recommender 8513 may use per-toolcast underlying condition specification, i.e., what are the conditions required for the toolcast to be playable in terms of the state of underlying system 200, the existence of required underlying system 200 structure and previous actions of the user (such as navigating to a specific URL). Information collected and generated by run-time recommender 8513 (such as a list of potential toolcasts to run at a given point) may be used to create a toolcast table of content of "tell me more" display.

It will be appreciated that TC player 85 may navigate within the toolcast (both BTC and CTC) based on the user's state and events within underlying system 200. This user state is defined based on information extracted from underlying system 200 (and possibly the underlying infrastructure hosting underlying system 200) by activation information gatherer 8511 and UNS analyzer 813. Such information may include displayed underlying system 200 information (e.g., site DOM). This information may include specific details, such as the currently displayed URL/page, which elements are visible, what is the content position within each element (e.g., the scroll bar position) etc.

The information may also include data exposed by underlying system 200 (from the client or server side) including data available through separate parallel channels and data extracted from underlying system 200 and analyzed by activation information analyzer 8512 as described herein above (regarding interfacing between toolcast management system 80 and underlying system 200 whether integrated or not).

It will be appreciated that some of the analyses by activation information analyzer 8512 described herein above can be pre-executed. For example, instead of doing the analysis at run-time, TC deployment agent 871 may perform analysis of the deployed underlying system 200 versions and gather initial information for the state mapping model whenever changes to the underlying system 200 are deployed.

Based on such run-time or pre-executed analysis, UNS structure mapper 84 may create and operate a mapping model to map between underlying system 200 state and data (such as complex DOM trees) and well-defined user states in a state chart.

UNS structure mapper 84 may use a mapping model to derive a user state (as defined herein above) and convert it to the system state. UNS structure mapper 84 may map the collected information (DOM, user location, underlying system 200 data, or otherwise) into a state in the state chart. It may then traverse between states in the state chart based on mapped user events and data and instruct TC activator 851 to activate toolcasts based on the derived system state. UNS structure mapper 84 may then generate output from the activated toolcasts, including multiple output types and effects as described in more detail herein below.

UNS structure mapper 84 may also implement a state chart integrated into a CTC (and forming the CTC's underlying graph structure). Toolcast management system 80 may also implement a separate state chart (e.g., one associated with underlying system 200 and not part of the CTC but still driving a separate toolcast playback).

It will be appreciated that toolcast management system 80 may employ alternative structures to map between underlying system 200 state and data, user activities, and toolcast flow. These alternative structures may include graph structures and the use of branching and conditionals.

As described herein above, the toolcast definition may include a variety of "outputs" that are operated, displayed, or activated by the running toolcast. These typically include generating events for underlying system 200 (such as keyboard or mouse events) and displaying ACEs (such as subtitles and audio). ACEs can include additional media types, including static and dynamic media.

These outputs may affect underlying system 200 by replicating the effects of user-originated events. TC player 85 may activate these effects through the interfacers of interface module 83 as described herein above. In particular, remote user simulator 853 may allow the toolcast to trigger responsive events on an underlying website DOM as if a remote user was doing it (click, drag, hover, scrolling, editing, and creating elements).

Generally, remote user simulator 853 may trigger the event by simulating the regular user action (e.g., the mouse clicks), thus minimizing the effort required to integrate the TCMS with underlying system 200. For example, remote user simulator 853 may dispatch a DOM event to the relevant elements. The element would typically react as if the dispatched event was triggered by a regular user.

Figure 15:
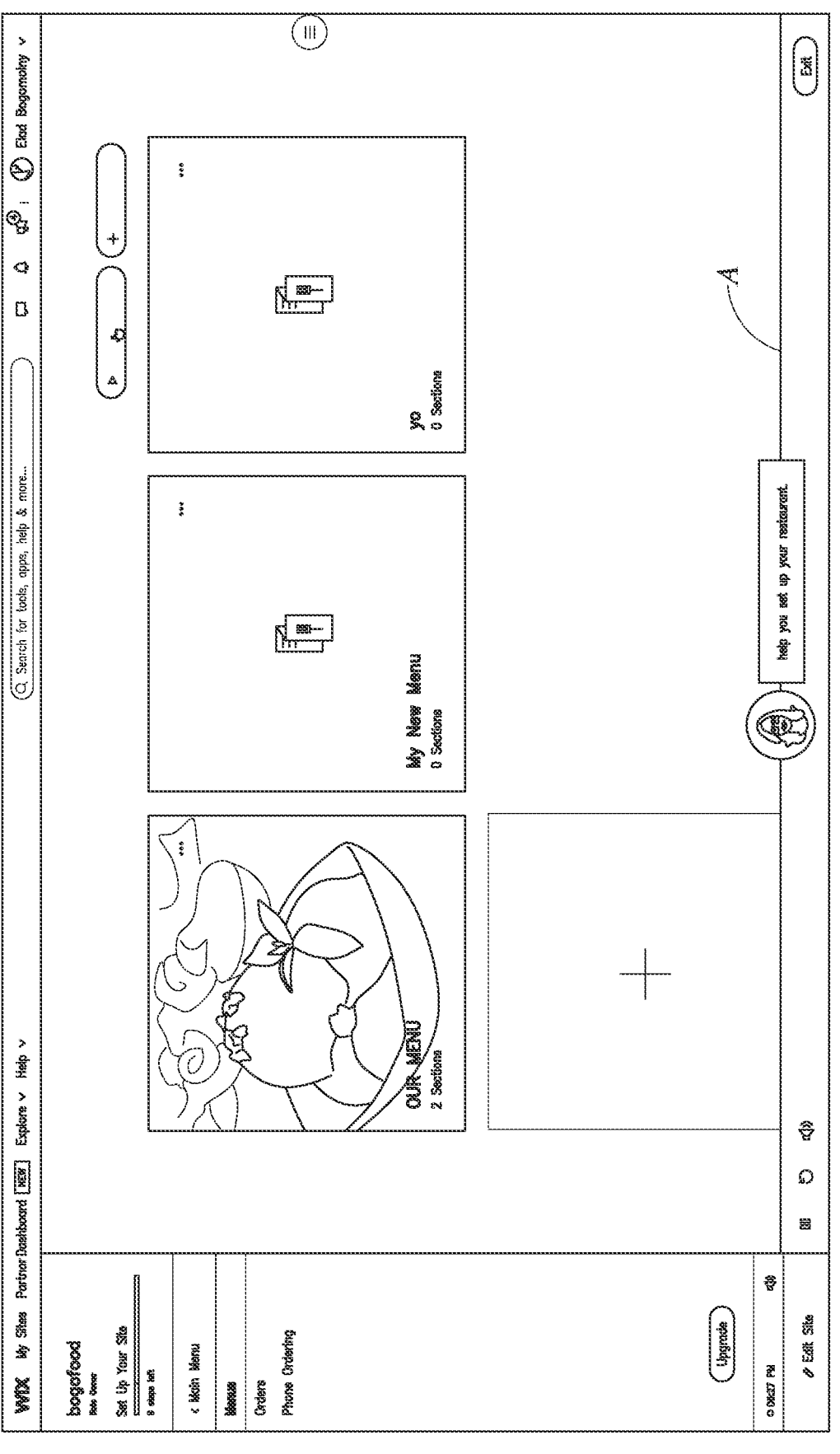
FIG. 15 is an illustrative screenshot of an interface for using a toolcast for a restaurant menu building system, constructed and operative in accordance with the present invention.
Figures 16, 17:
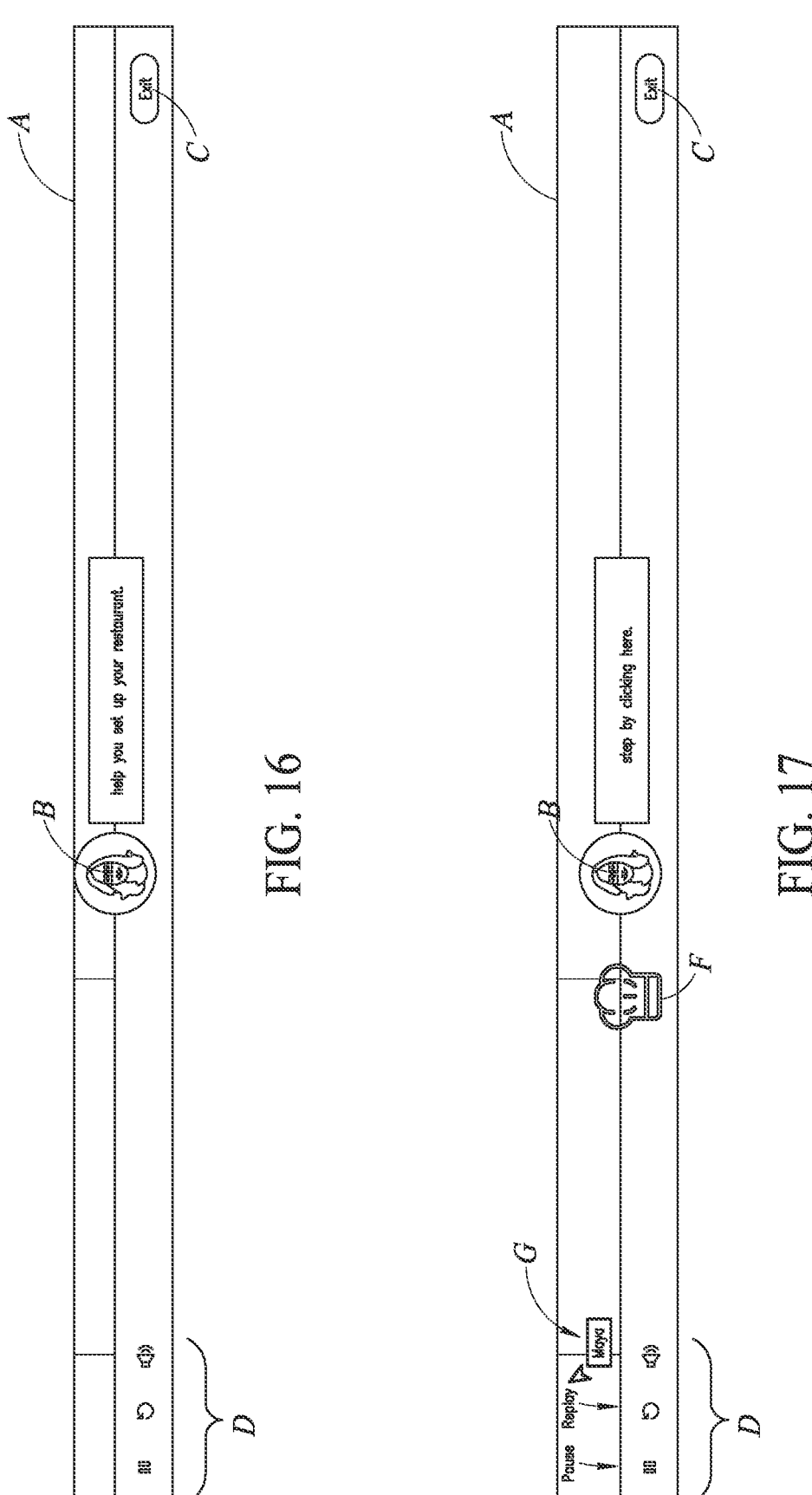
FIG. 16 is a detail of the interface of FIG. 15 showing a TC player control toolbar, constructed and operative in accordance with the present invention.
FIG. 17 is an embodiment of the detail of FIG. 15 displaying additional content elements, constructed and operative in accordance with the present invention.

It will be appreciated that TC player 85 may provide various UIs in the form of toolbars in order to provide user input for both TC creator 81 and TC player 85 as described herein above. TC control toolbar displayer 854 may display toolbars for the user to control the display of a toolcast as required. Reference is now made to FIGS. 15, 16 and 17 which illustrate such toolbar interfaces.

FIG. 15 illustrates TC player 85 running a toolcast for a restaurant menu building system, with a toolcast toolbar A displayed at the bottom of the page.

FIG. 16 is a closeup of toolbar A showing control buttons D such as pause, replay, volume as shown on the left hand aside, the image of a virtual trainer avatar B (a person representing the toolcast "voice", the current subtitle ("help you set up your restaurant") and an exit button C to leave the toolcast system).

Reference is now made to FIG. 17 which shows a different embodiment of toolbar A. This version shows additional drawings (ACEs) F placed by TC player 85 on top of the underlying system 200 screen. In this case, the drawings are in the toolcast toolbar area, but they can be added elsewhere on the underlying system 200 screen. The drawings include "pause" and "replay" labels next to the relevant toolbar buttons and a chef's hat F. It will be appreciated that there is also a toolcast-specific cursor G to guide the toolcast viewer and point at the relevant elements. In this embodiment, the toolcast cursor is labeled "Maya" to provide personification of the toolcast virtual trainer for the viewer or user.

It will be appreciated that with an integrated underlying system 200, toolcast management system 80 has two significant advantages. Firstly, TC deployment agent 871 is integrated with the underlying system 200 development framework or WBS, and can ensure detection of any toolcast breakdown. Secondly, if required user events are hard to simulate, interface module 83 may inject a remote user simulator 853 into underlying system 200 (or its underlying framework) to replace these hard-to-simulate actions.

ACE displayer 855 may create additional or augmented UI elements on top of the underlying website or modifying existing elements. These modifications may be based on the use of "floating elements" added above the current underlying system 200 view (possibly using an added display "layer"). This allows using the underlying system 200 screen to function as a smart whiteboard to which the toolcast management system 80 user can add markers, arrows, text, etc.

User interaction manager 856 may manage the interface between TC player 85 and the user during the running of a toolcast such as receiving instructions from the user and handling extra elements such as a pop up questionnaires requiring input during a live toolcast.

It will be appreciated that TC player 85 may respond to each user interaction (e.g., question response).

User interaction manager 856 may provide a "reaction mode" in which the editing of the TC elements' behavior (such as actions/reactions) may be made in an integrated manner with a modified version of the relevant underlying system 200 elements.

In such a mode, user interaction manager 856 may modify the display of specific underlying system 200 elements to reflect the current action associated with the element. The user may also select an action and associate it with a given underlying system 200 element.

For example, TC player 85 may modify an element with a yellow boarder if clicking the element leads to a different toolcast step. It may also modify an element with a red outline if clicking this element's area stops the toolcast.

TC player 85 may also modify existing elements in underlying system 200. Such modifications may include highlighting elements, hiding them, or otherwise changing their attributes and settings. For underlying websites, such modifications may be made at the DOM level.

For WBS-hosted underlying websites, toolcast management system 80 may support adding and modification at the component level. Furthermore, the underlying WBS may provide additional services as a recipient of such effects and actions, such as applying dynamic layout or responsive editing to new or modified components (as described U.S. Pat. Nos. 10,185,703 and 10,984,177).

It will be appreciated that such website modification may be adapted to different methods of rendering of the website, as described herein above.

It will be further appreciated that underlying system 200 usually works in conjunction with a toolcast management system 80 as it would work without toolcast management system 80. Thus, navigating through and operating underlying system 200 may cause multiple persistent effects, such as database changes or requests being made to connected systems.

However, in some cases, the toolcast management system 80 user would like to work with underlying system 200 in a way that limits the persistent side effects resulting from the underlying system 200 operation. Such cases may include when doing toolcast "dry runs" to gather information for follow-up toolcast construction and when editing toolcasts. For example, when doing multiple rounds of editing of a toolcast which describes a product purchase operation, the user may not want to order multiple copies of the product used for demonstration.

The user may also wish to limit persistent side effects in the toolcast finalization phase (described herein above), in which toolcast management system 80 performs a toolcast run to gather timing information and also during toolcast playback, when studying a underlying system 200 operation with substantial side effects (and using rewind or forward on the toolcast).

For some toolcasts, the side effects problem is mitigated, as the toolcast calls for the users to activate the (side effect causing) operations by themselves. TC player 85 may guide the user and encourage the user to make the changes, but the user may elect to do so or not.

For other toolcasts, toolcast management system 80 may use a number of technologies that may be implemented by underlying system 200 or the underlying WBS/development framework level. These technologies may include using an underlying system that implements a special mode in which changes, and side effects made by the underlying system are not saved in a persistent manner. The underlying system may still save such changes in the underlying system's database during the toolcast session (otherwise, the toolcast sessions would lack context).

Other technologies may also include implementing a parallel database used when running a toolcast instead of the underlying system's regular database and implementing an underlying transaction system with rollback/undo capabilities.

Underlying system 200 may interact with additional related systems. These related systems may also be required to use the technologies detailed herein above, and support coordinated rollback/undo across the multiple systems involved.

As discussed herein above, toolcast management system 80 may make use of multiple ML (machine learning) engines 882 for analysis, recommendation generating, transformation, and other needs.

As discussed herein above ML engines manager 88 may gather data and train multiple different ML models for different needs and different ML-based engines. ML engines manager 88 may generate new models (based on the gathered training data) and may evaluate their performance against the existing models. Training data may include any of the gathered information, as well as information on actions performed based on the various recommendations.

It will be appreciated that the ML models may be any suitable model for the task or activity implemented by each ML-based engine. Machine learning models are known in the art and are typically some form of neural network. The term refers to the ability of systems to recognize patterns on the basis of existing algorithms and data sets to provide solution concepts. The more they are trained, the greater knowledge they develop.

The underlying ML models may be learning models (supervised or unsupervised). As examples, such algorithms may be prediction (e.g., linear regression) algorithms, classification (e.g., decision trees, k-nearest neighbors) algorithms, time-series forecasting (e.g., regression-based) algorithms, association algorithms, clustering algorithms (e.g., K-means clustering, Gaussian mixture models, DB scan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative models (e.g., GANs).

Alternatively, ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks or autoencoders) to generate TC definitions and elements.

For most embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein.

In another embodiment and when appropriate for the particular task, one or more of the ML models may be implemented with rule-based systems, such as an expert system or a hybrid intelligent system that incorporates multiple AI techniques. These are discussed in the Wikipedia articles entitled "Rule-Based System" and "Hybrid Intelligent System", at en.wikipedia.com.

It will be also appreciated that toolcast management system 80 may provide additional capabilities based on the toolcasts. Such capabilities are outside of regular use of toolcasts through TC player 85.

The toolcasts themselves (at both the BTC and CTC level) work in conjunction with underlying system 200, providing underlying system 200 with inputs and reviewing and analyzing its operation). The generated products, however, may work standalone and not in conjunction with a running underlying system 200.

In particular, auto executor 891 may auto-execute the toolcast (or parts thereof) to generate a number of possible alternative products (or deliverables). These products may have a linear or a non-linear/branching structure and may be interactive or not.

At the CTC level, auto executor 891 may arrange the various CTC sub-elements in an appropriate order for linear presentation. This may be based (for example) on analyzing the CTC elements' content or on hints included in the CTC elements. Auto executor 891 may also use information and hints provided by an underlying website, directly or based on such information and hints from the underlying templates used to construct the website.

It will be appreciated that this auto-execution may require underlying system 200 to provide a sequence of underlying system 200 inputs (e.g., UI interactions) instead of the user. Such inputs may be in addition to the input sequences covered by existing toolcasts. These inputs may be generated based on collected toolcast user (playback) responses (as noted above). These inputs can also be generated by an ML model analyzing these collected inputs to recommend the right way to proceed through the toolcast.

Generated products may include a regular video, e.g., for documenting underlying system 200 or providing training in its use. Such a video can be played using regular video file players (such as VLC by VideoLAN). Generated products may further include an interactive video using a separate interactive video player. Such interactive video may be based, for example, on the use of "hot regions", which can be clicked in the video to cause branching inside the video, or to external media outside of the video.

Other generated products may include a standalone website or application (e.g., mobile or desktop), such a website or application can provide a visual simulation of underlying system 200 or training regarding underlying system 200 without requiring actual underlying system 200 access.

They may also include a standalone playable data file, such a format may include (for example) timing, text, and image content providing an interactive tutorial run by a specialized player. The player would still not require the underlying system 200 to be present or any integration to operate and may further include an analysis and coverage map, e.g., one which indicates which parts of the underlying system 200 code (or screens or objects) have been "covered" by toolcast content.

It will be appreciated that the additional toolcast based deliverable product as described herein above may also require maintenance when underlying system 200 changes, similar to the toolcast maintenance described above. In such a case, the mechanisms described above (for underlying system 200 change handling) may apply to these additional toolcast-based deliverables.

It will be appreciated that the generated products may include offline products, such as written documentation generated based on the toolcast content in conjunction with the displayed underlying system 200 content.

Appstore interface 8100 may support the offer and delivery of toolcasts via an Appstore (including through in-app purchase). The Appstore could offer toolcasts as separate saleable objects. The Appstore could also offer toolcasts as an add-on to existing applications sold in the relevant Appstore.

Tooltip handler 8101 may add toolcasts to existing tooltips, including tooltips which are created as a toolcast activation UI, thus enabling a simple way to extend an app with toolcasts. These tooltips may be known as live tooltips.

Live tooltips look like normal tooltips, but have a corresponding "Tell me more" play button, that starts a toolcast immediately, and in the same context. This quick replacement enables a way to integrate toolcasts in a system with very little UI/UX (user experience) effort.

It will be appreciated that toolcasts can also be recorded by third party content creators or "influencers" and then triggered in conjunction with use of underlying system 200. This could be, for example, using special link. In this way the link to the website will open both the underlying of underlying system 200, and also the toolcast recorded by the third party content creator.

As part of this system, both the toolcast management system 80/underlying system 200 vendors may employ various means to ensure the quality, functionality, safety, coverage and appropriateness of the provided toolcast. The toolcast management system 80 or underlying system 200 vendors may also (fully or partially) disqualify toolcasts which are abusive, do not describe the underlying system 200 properly, are low quality, infringe intellectual property rights and that may pose security risks (e.g., by linking to an improper external website), etc.

Therefore, a toolcast management system may be used in conjunction with an underlying system such as a website building system to create and run toolcasts to provide help, events, subtitles etc. based on user data, underlying system state and may handle direct interaction with the user.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for creating and displaying toolcasts, the system comprising:

a processor; and a toolcast management system running on said processor in communication with an underlying system, said toolcast management system to generate and update at least one user adapted toolcast to provide updated media guidance to a single user of multiple users of said underlying system according to at least user requirements, interactions between said user and said at least one user adapted toolcast and at least one of: attributes, parameters and configurations stored by said underlying system about said single user and objects of said underlying system, said toolcast management system comprising:

an interface module to interface with said underlying system and to detect said user requirements, said interactions and said at least one of: attributes, parameters and configurations from said underlying system to be recorded in a recording phase for said at least one user adapted toolcast;

a TC (toolcast) creator to receive said user requirements, said interactions and said at least one of: attributes, parameters and configurations and to record, create and modify said at least one user adapted toolcast accordingly;

wherein said at least one user adapted toolcast is an object-oriented user adapted toolcast that stores displayed objects of said underlying system and user interactions with stored displayed objects according to at least object relative coordinates; and a TC (toolcast) player to play said at least one user adapted toolcast while interacting with said single user.

2. The system according to claim 1 wherein said underlying system is integrated with said toolcast management system.

3. The system according to claim 1 wherein said at least one user adapted toolcast is at least one of: active tutorials, documentation, courseware and intra-user messaging.

4. The system according to claim 1 wherein said underlying system is at least one of: a website, a website building system and a document editing system.

5. The system according to claim 1 and further comprising at least one of:

a database to store basic toolcasts and composite toolcasts;

a maintenance module to maintain said at least one user adapted toolcast when a change is made to said underlying system;

a toolcast synchronizer to support synchronization of said at least one user adapted toolcast with other related toolcasts when a change is made to said underlying system;

an underlying system structure mapper to provide mapping of structures, associations, events and interfaces of said underlying system to said toolcast management system for said at least one user adapted toolcast; and a ML (machine learning) manager to gather data about said underlying system and about said user and to provide machine learning training and support for said TC creator and said TC player accordingly.

6. The system according to claim 1 and wherein said TC creator comprises at least one of:

a toolcast storyboard creator to generate a storyboard for said at least one user adapted toolcast;

a generative text engine to generate text for said storyboard for said at least one user adapted toolcast;

an UNS (underlying system) analyzer to analyze elements and site structure of said underlying system;

a BI (business intelligence) analyzer to analyze collected business intelligence (BI) information from said underlying system;

a CTC (composite toolcast) creator to create a composite toolcast comprising a hierarchy of basic toolcasts;

a text based recorder to enable a designer of said at least one user adapted toolcast to create a text based toolcast using a rich text editor;

a voice based recorder to enable a designer of said at least one user adapted toolcast to record themselves and to convert said recording into a toolcast file;

an association manager to create toolcast associations in an interfaced configuration of said toolcast management system and said underlying system;

a TC (toolcast) path optimizer to determine and optimize the flow of activity of said at least one user adapted toolcast;

an edit time recommender to offer editing hints and options to said designer of said at least one user adapted toolcast;

a coverage analyzer to detect mismatches between said underlying system and said at least one user adapted toolcast according to a toolcast definition of said at least one user adapted toolcast; and an UNS (underlying system)/TC (toolcast) editor to provide integrated editing or combined editing of said underlying system together with said at least one user adapted toolcast.

7. The system according to claim 1 wherein said TC player comprises at least one of:

a TC activator to automatically enable activation of said at least one user adapted toolcast by said user;

a remote user simulator to enable said at least one user adapted toolcast to trigger responsive events on said underlying system by simulating actions of said user;

a TC (toolcast) control bar displayer to display toolbars to enable said user to control the display of said at least one user adapted toolcast;

an ACE (assistive content element) displayer to create additional or augmented UI (user interface) elements on top of said display by said TC control bar displayer; and a user interaction manager to enable interaction between said at least one user adapted toolcast and said user while said at least one user adapted toolcast is playing.

8. The system according to claim 1 wherein said interface module comprises at least one of:

an integrated interfacer to interface with an integrated underlying system;

a non-integrated interface to interface with non-integrated underlying system; and an UNS (underlying system) database interfacer to interface with an underlying system database to provide data for analysis by said TC creator.

9. A method, the method comprising:

generating and updating at least one user adapted toolcast to provide updated media guidance to a single user of multiple users of an underlying system interfaced with a toolcast management system according to user requirements, interactions between said user and said at least one user adapted toolcast and at least one of:

attributes, parameters and configurations stored by said underlying system about said single user and objects of said underlying system, said generating and updating comprising:

interfacing with said underlying system;

detecting and receiving said user requirements, said interactions and said at least one of: attributes, parameters and configurations from said underlying system to be recorded in a recording phase for said at least one user adapted toolcast;

recording, creating and modifying said at least one user adapted toolcast according said user requirements, said interactions and said at least one of: attributes, parameters and configurations;

wherein said at least one user adapted toolcast is an object-oriented user adapted toolcast that stores displayed objects of said underlying system and user interactions with stored displayed objects according to at least object relative coordinates; and playing said at least one user adapted toolcast while interacting with said single user.

10. The method according to claim 9 wherein said underlying system is integrated with said toolcast management system.

11. The method according to claim 9 wherein said at least one user adapted toolcast is at least one of: active tutorials, documentation, courseware and intra-user messaging.

12. The method according to claim 9 wherein said underlying system is at least one of: a website, a website building system and a document editing system.

13. The method according to claim 9 and further comprising at least one of:

storing in a database basic toolcasts and composite toolcasts;

maintaining said at least one user adapted toolcast when a change is made to said underlying system;

supporting synchronization of said at least one user adapted toolcast with other related user adapted toolcasts when a change is made to said underlying system;

providing mapping of structures, associations, events and interfaces of said underlying system to said toolcast management system for said at least one user adapted toolcast; and gathering data about said underlying system and about said user and providing machine learning training and support for said recording, generating and editing said at least one user adapted toolcast and said playing said at least one user adapted toolcast accordingly.

14. The method according to claim 9 and wherein said recording, creating and modifying said at least one user adapted toolcast comprises at least one of:

generating a storyboard for said at least one user adapted toolcast;

generating text for said storyboard for said at least one user adapted toolcast;

analyzing elements and site structure of said underlying system;

analyzing collected business intelligence (BI) information from said underlying system;

creating a composite toolcast comprising a hierarchy of basic toolcasts;

user adapted enabling a designer of said at least one user adapted toolcast to record themselves and converting said recording into a toolcast file;

creating toolcast associations in an interfaced configuration of said toolcast management system and said underlying system;

determining and optimizing the flow of activity of said at least one user adapted toolcast;

offering editing hints and options to said designer of said at least one user adapted toolcast;

detecting mismatches between said underlying system and said at least one user adapted toolcast according to a toolcast definition of said at least one user adapted toolcast; and providing integrated editing or combined editing of said underlying system together with said at least one user adapted toolcast.

15. The method according to claim 9 wherein said playing said at least one user adapted toolcast comprises at least one of:

automatically enabling activation of said at least one user adapted toolcast by said user;

enabling said at least one user adapted toolcast to trigger responsive events on said underlying system by simulating actions of said user;

displaying toolbars to enable said user to control the display of said at least one user adapted toolcast;

creating additional or augmented UI (user interface) elements on top of said display by said displaying toolbars; and enabling interaction between said at least one user adapted toolcast and said user while said at least one user adapted toolcast is playing.

16. The method according to claim 9 wherein said interfacing with said underlying system comprises at least one of:

interfacing with an integrated underlying system;

interfacing with a non-integrated underlying system; and interfacing with an underlying system database to provide data for analysis by said recording, generating and editing.

* * * * *